US012515136B2

(12) United States Patent
Sato

(10) Patent No.: US 12,515,136 B2
(45) Date of Patent: Jan. 6, 2026

(54) STORAGE MEDIUM STORING GAME PROGRAM, GAME APPARATUS, GAME SYSTEM, AND GAME PROCESSING METHOD

(71) Applicant: NINTENDO CO., LTD., Kyoto (JP)

(72) Inventor: Shintaro Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 424 days.

(21) Appl. No.: 18/355,865

(22) Filed: Jul. 20, 2023

(65) Prior Publication Data

US 2024/0042327 A1 Feb. 8, 2024

(30) Foreign Application Priority Data

Aug. 2, 2022 (JP) ................................ 2022-123323

(51) Int. Cl.
*A63F 13/69* (2014.01)
*A63F 13/44* (2014.01)
*A63F 13/53* (2014.01)
*A63F 13/56* (2014.01)

(52) U.S. Cl.
CPC .............. *A63F 13/69* (2014.09); *A63F 13/44* (2014.09); *A63F 13/53* (2014.09); *A63F 13/56* (2014.09)

(58) Field of Classification Search
None
See application file for complete search history.

(56) References Cited

U.S. PATENT DOCUMENTS

2002/0103031 A1* 8/2002 Neveu .................. A63F 13/537 463/49
2014/0031115 A1* 1/2014 Tanabe .................... A63F 13/12 463/31
2015/0328548 A1* 11/2015 Sato ........................ A63F 13/63 463/31
2019/0015744 A1* 1/2019 Ueda ....................... A63F 13/24
2021/0252400 A1* 8/2021 Morishita ............ A63F 13/822
2022/0258055 A1* 8/2022 Sato ........................ A63F 13/56
2023/0310996 A1 10/2023 Xu

FOREIGN PATENT DOCUMENTS

CN 111957044 11/2020
EP 1475133 A1 * 11/2004 ........... A63F 13/847
JP 2003062343 A * 3/2003
JP 2015-008966 1/2015
JP 2015-216971 12/2015
JP 2015216971 A 12/2015
JP 2021-081336 5/2021

* cited by examiner

*Primary Examiner* — Tramar Harper
(74) *Attorney, Agent, or Firm* — Nixon & Vanderhye PC

(57) ABSTRACT

A first appearance region for a first group is set at or near a center of a game stage. A second and a third appearance region for a second and a third group are set closer to respective end portions of the game stage than the first appearance region is. A character is caused to perform an action more advantageously in a game when the character is in a region rendered in a color relating to the group to which the character belongs than when the character is not in the region. It is determined that the first group is a winner in a game when a first condition is satisfied based on actions performed by the characters, and that the second and third groups are a winner in the game when a second condition is satisfied based on actions performed by the characters.

20 Claims, 21 Drawing Sheets

STORAGE MEDIUM STORING GAME PROGRAM, GAME APPARATUS, GAME SYSTEM, AND GAME PROCESSING METHOD

CROSS REFERENCE TO RELATED APPLICATION

This application claims priority to Japanese Patent Application No. 2022-123323, filed on Aug. 2, 2022, the entire contents of which are incorporated herein by reference.

FIELD

The technology disclosed herein relates to a game program-storing storage medium, game apparatus, game system, and game processing method that execute a game in which groups to which a plurality of characters belong compete with each other.

BACKGROUND AND SUMMARY

There has conventionally been an information processing system that performs a game process in which two groups compete with each other simultaneously.

In a game in which three or more groups participate and compete with each other, individual users have difficulty in choosing a tactic that they should adopt in order to win the game.

With the above in mind, it is an object of the present example to provide a game program-storing, non-transitory, computer-readable storage medium, game apparatus, game system, and game processing method that improve the tactic aspect of a game in which three or more groups participate and compete with each other.

To achieve the object, the present example may have features (1) to (23) below, for example.

(1) An example configuration of a non-transitory computer-readable storage medium having stored therein a game program according to the present example is executed by a computer of an information processing apparatus. The game program causes the computer to perform operations comprising: controlling a plurality of characters each belonging to one of a first group, a second group, and a third group, separately, in a virtual space; setting a first appearance region in which a character belonging to the first group appears on a game stage, at or near a center of the game stage, and setting a second appearance region and a third appearance region in which characters belonging to the second group and the third group, respectively, appear on the game stage, closer to respective end portions of the game stage than the first appearance region is; based on an action performed by each character, rendering a color relating to a group to which the character belongs on the game stage; causing a character belonging to one of the groups to perform an action more advantageously in a game when the character is in a region rendered in the color relating to the group to which the character belongs than when the character is not in the region; and determining that the first group is a winner in the game when a first condition that is a winning condition for the first group is satisfied based on actions performed by the characters, and that the second and third groups are a winner in the game when a second condition that is a winning condition for the second and third groups is satisfied based on actions performed by the characters.

With the configuration of (1), in a competition game in which three groups participate, a side including a first group having an appearance region at or near a center of a game stage competes with a side including a second group and a third group having an appearance region closer to respective end portions of the game stage than the appearance region of the first group is, and a winning condition for the second and third groups is set. As a result, in the game in which three groups participate, the target of an action that should be performed by each group is clarified. Therefore, the tactic aspect of a competition between three groups can be improved.

(2) In the configuration of (1), it may be determined whether or not the first or second condition is satisfied, and which of the groups is a winner, based on the area of the region rendered in the color relating to the first group, the area of the region rendered in the color relating to the second group, and the area of the region rendered in the color relating to the third group.

With the configuration of (2), the areas of the rendered regions in the colors relating to the groups are used in order to determine win/loss in a game, whereby the winning condition for each group can be clarified.

(3) In the configuration of (1) or (2), it may be determined that the first condition is satisfied, so that the first group is a winner, when the area of the region rendered in the color relating to the first group is greater than the area of each of the region rendered in the color relating to the second group and the region rendered in the color relating to the third group, and it may be determined that the second condition is satisfied, so that the second and third groups are a winner, when the area of the region rendered in the color relating to the first group is smaller than the area of at least one of the region rendered in the color relating to the second group and the region rendered in the color relating to the third group.

With the configuration of (3), the winning condition under which the second and third groups are a winner when at least one of the region rendered in the color relating to the second group and the region rendered in the color relating to the third group is greater than the area of the region rendered in the color relating to the first group, is used, whereby a winning condition shared by the second and third groups can be set.

(4) In the configuration of any one of (1) to (3), it may be determined whether or not the first or second condition is satisfied, and which of the groups is a winner, based on the area of the region rendered in the color relating to the first group, and the sum of the area of the region rendered in the color relating to the second group and the area of the region rendered in the color relating to the third group.

With the configuration of (4), the sum of the area of the region rendered in the color relating to the second group and the area of the region rendered in the color relating to the third group is used in order to determine win/loss in a game, whereby a winning condition shared by the second group and third group can be set.

(5) In the configuration of (1) or (2), the game program may further cause the computer to perform operations comprising: causing one of the characters that satisfies a disappearance condition to disappear from the game stage, and causing the disappearing character to appear again in the appearance region set for the group to which the disappearing character belongs.

With the configuration of (5), characters of different groups are allowed to appear again in different regions, and therefore, a region in which a character is easily disposed can be set for each group.

(6) In the configuration of (5), the game program may further cause the computer to perform operations comprising: causing the disappearing character to appear again in the appearance region after a waiting period of time has passed since the disappearance from the game stage, wherein the waiting period of time for the character belonging to the first group is chosen to be shorter than the waiting period of time set for the characters belonging to the second and third groups.

With the configuration of (6), constraints on the first group's advantage in terms of win/loss in a game can be relaxed.

(7) In the configuration of any one of (1) to (6), the controlling the characters may include choosing the number of characters belonging to the first group to be greater than each of the number of characters belonging to the second group and the number of characters belonging to the third group.

With the configuration of (7), a balance between the powers or strengths of the first group and the second and third groups can be achieved in a game.

(8) In the configuration of (7), the controlling the characters may include choosing the number of characters belonging to the first group to be equal to the sum of the number of characters belonging to the second group and the number of characters belonging to the third group.

With the configuration of (8), a balance between the first group and the second and third groups can be maintained in a game.

(9) In the configuration of any one of (1) to (8), the game program may further cause the computer to perform operations comprising: disposing a first object at or near a center of the game stage; and when one of the characters performs a first action on the first object, then if the first action satisfies an acquisition condition, disposing a second object relating to the first object at a location on the game stage in association with the group to which the character performing the first action satisfying the acquisition condition belongs. The color relating to the group associated with the second object may be rendered on the game stage around the second object.

With the configuration of (9), a group associated with the second object can have an advantage in terms of win/loss in a game.

(10) In the configuration of (9), the character belonging to the second or third group may be allowed to perform the first action on the first object.

With the configuration of (10), constraints on the first group's advantage in terms of win/loss in a game can be relaxed.

(11) In the configuration of (9) or (10), the first object may be caused to appear and is disposed after a first period of time has passed since the start of the game and after a second period of time has passed since the performance of the first action.

With the configuration of (11), tactics for acquiring the second object can be more easily developed, resulting in a game having various tactic aspects.

(12) In the configuration of any one of (7) to (9), when as the first action, an action of causing a character to remain in a range with reference to the first object disposed on the game stage is performed, it may be determined that the acquisition condition is satisfied, and the second object is disposed.

With the configuration of (12), tactics involving characters' actions with reference to the appearing first object can be increased, resulting in a game having more tactic aspects.

(13) In the configuration of (12), when a time count for which the character has remained in the range reaches a threshold time, it may be determined that the acquisition condition is satisfied, and the second object may be disposed. When the character ends remaining in the range before the time count reaches the threshold time, the time count may be reset, and the threshold time may be reduced and set for the next time count.

With the configuration of (13), by repeating a character's action of acquiring the second object, the acquisition of the second object can be gradually facilitated.

(14) In the configuration of any one of (9) to (13), the relating color may continue to be rendered around the second object until the end of the game.

With the configuration of (14), a group associated with the second object can have a greater advantage in terms of win/loss in a game.

(15) In the configuration of any one of (9) to (14), the game program may further cause the computer to perform operations comprising: when a special action parameter relating to the character reaches a value, allowing the character to perform a special action according to a user's operation input; and increasing the special action parameters of all characters belonging to the group relating to the second object, in response to rendering in the relating color by the second object.

With the configuration of (15), a character belonging to a group associated with the second object is allowed to easily perform a special action.

(16) In the configuration of any one of (1) to (15), the game program may further cause the computer to perform operations comprising: when a special action parameter relating to the character reaches a value, allowing the character to perform a special action according to a user's operation input. The allowing the character to perform a special action may include increasing the special action parameter of the character, in response to rendering in the relating color based on an action performed by the character, when in the region in which the relating color has already been rendered, the same relating color is further rendered, avoiding increasing the special action parameter in response to the rendering, when the color relating to the third group is rendered in a region in which the color relating to the second group has already been rendered, increasing the special action parameters of all characters belonging to the third group or the character for which the rendering has been performed, and when the color relating to the second group is rendered in a region in which the color relating to the third group has already been rendered, increasing the special action parameters of all characters belonging to the second group or the character for which the rendering has been performed.

With the configuration of (16), a character belonging to one of the second and third groups, which cooperate with each other, alternately performs rendering in the rendered region of another cooperating group, so that a beneficial effect that allows a special action can be obtained by the characters.

(17) In the configuration of any one of (1) to (16), the game program may further cause the computer to perform operations comprising: setting a plurality of group candidates by assigning a character operated by a user performing an operation input, to one of three group candidates, according to vote based on the user's operation input. The setting the group candidates may include setting each of the three group candidates to a first group candidate from which a character belonging to the first group is to be chosen, a second group candidate from which a character belonging to the second group is to be chosen, or a third group candidate from which a character belonging to the third group is to be chosen, based on a result of a game in which characters which are assigned to two of the three group candidates compete with each other.

With the configuration of (17), by users' votes, a character operated by each user can be assigned to a group to which the character is to belong.

(18) In the configuration of (17), the setting the group candidates may include, when a matching-up condition for different group candidates is not satisfied, setting the first, second, and third group candidates, additionally using a result of a game in which characters which are assigned to the same one of the three group candidates compete with each other.

With the configuration of (18), matching-up for a competition can be easily achieved.

(19) In the configuration of (17) or (18), the game program may further cause the computer to perform operations comprising: aggregating achievements of characters which are assigned to the three group candidates, for each group candidate, to calculate rankings of the group candidates. The setting the group candidates may include setting the first, second, and third group candidates based on the calculated rankings.

With the configuration of (19), difficulty in matching up groups due to a difference in popularity between defense and offense in a competition game can be minimized

(20) In the configuration of any one of (17) to (19), the game program may further cause the computer to perform operations comprising: shifting to a second period during which three groups that are the first, second, and third groups are allowed to perform a competition game after the end of a first period until the first, second, and third group candidates are set in the setting the group candidates.

With the configuration of (20), a plurality of periods having different competition forms can be provided, resulting in a competition game having various features.

(21) In the configuration of (20), the setting the group candidates may include setting a best group candidate as the first group candidate based on assessment using achievements during the first period of characters which are each assigned to one of the three group candidates.

With the configuration of (21), a competition game can be embodied in which a group having higher achievements competes with a plurality of groups having lower achievements, which cooperate with each other.

(22) In the configuration of (20) or (21), the game program may further cause the computer to perform operations comprising: choosing one of a competition form in which a competition game is performed by three groups that are the first, second, and third groups during the second period, and a competition form in which a competition game is performed by two chosen from the three groups during the second period. The choosing one of the competition forms may include choosing one of the competition forms based on a user's operation input of operating a character belonging to the second or third group.

With the configuration of (22), a competition form can be chosen by a user operating a character belonging to a group having lower achievements.

(23) In the configuration of any one of (17) to (22), the game program may further cause the computer to perform operations comprising: calculating rankings of the first, second, and third group candidates based on at least one of assessment based on the number of votes, assessment based on win/loss of a competition game performed by groups chosen from the group candidates, and assessment based on achievements of characters which are each assigned to one of the group candidates.

With the configuration of (23), rankings of groups can be calculated based on a comprehensive result.

The present example may also be carried out in the form of a game apparatus, game system, and game processing method.

According to the present example, tactic aspects of a competition between three groups can be improved in a game in which the three groups participate.

These and other objects, features, aspects and advantages of the present exemplary embodiment will become more apparent from the following detailed description of the present exemplary embodiment when taken in conjunction with the accompanying drawings.

DETAILED DESCRIPTION OF NON-LIMITING EXAMPLE EMBODIMENTS

A game system according to the present example will now be described. An example of a game system 1 according to the present example includes a main body apparatus (information processing apparatus serving as the main body of a game apparatus in the present example) 2, a left controller 3, and a right controller 4. The left controller 3 and the right controller 4 are attachable to and detachable from the main body apparatus 2. That is, the user can attach the left controller 3 and the right controller 4 to the main body apparatus 2, and use them as a unified apparatus. The user can also use the main body apparatus 2 and the left controller 3 and the right controller 4 separately from each other (see FIG. 2). In the description that follows, a hardware configuration of the game system 1 of the present example is described, and thereafter, the control of the game system 1 of the present example is described.

Figure 1:
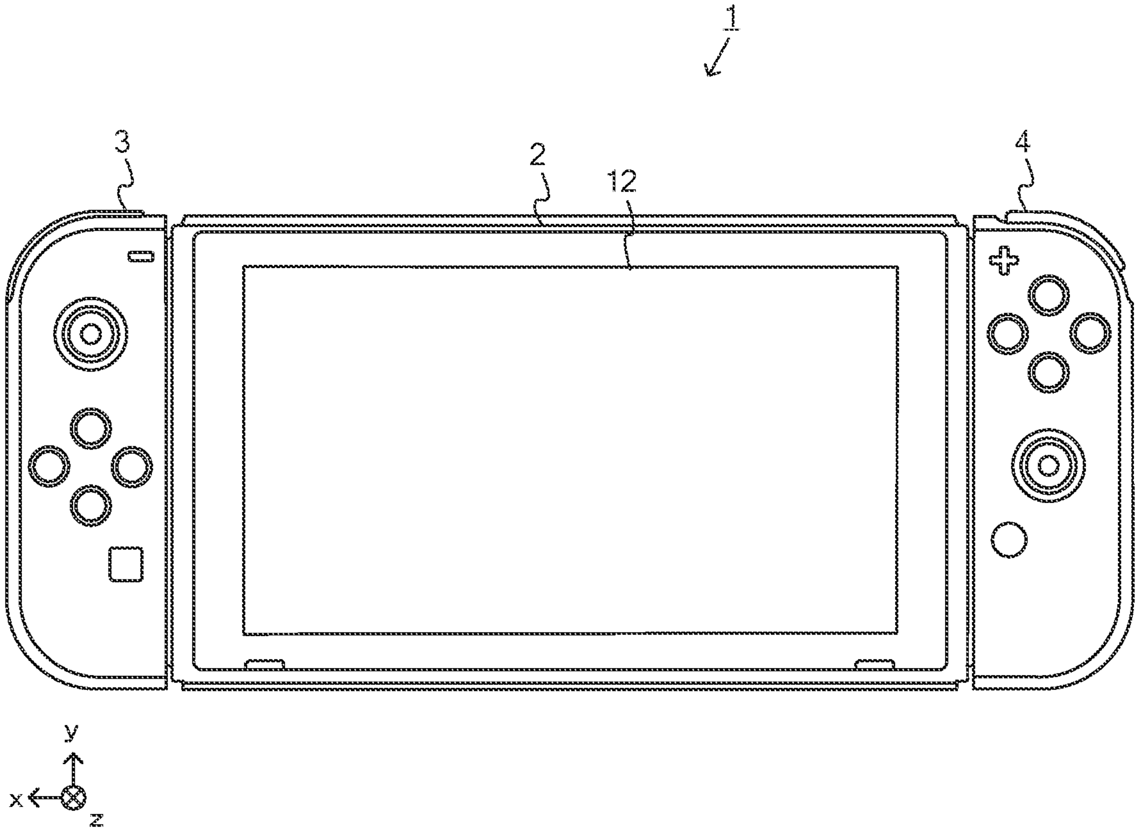
FIG. 1 is a diagram illustrating a non-limiting example of a state in which a left controller 3 and a right controller 4 are attached to a main body apparatus 2.

FIG. 1 is a diagram illustrating an example of a state in which the left controller 3 and the right controller 4 are attached to the main body apparatus 2. As illustrated in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
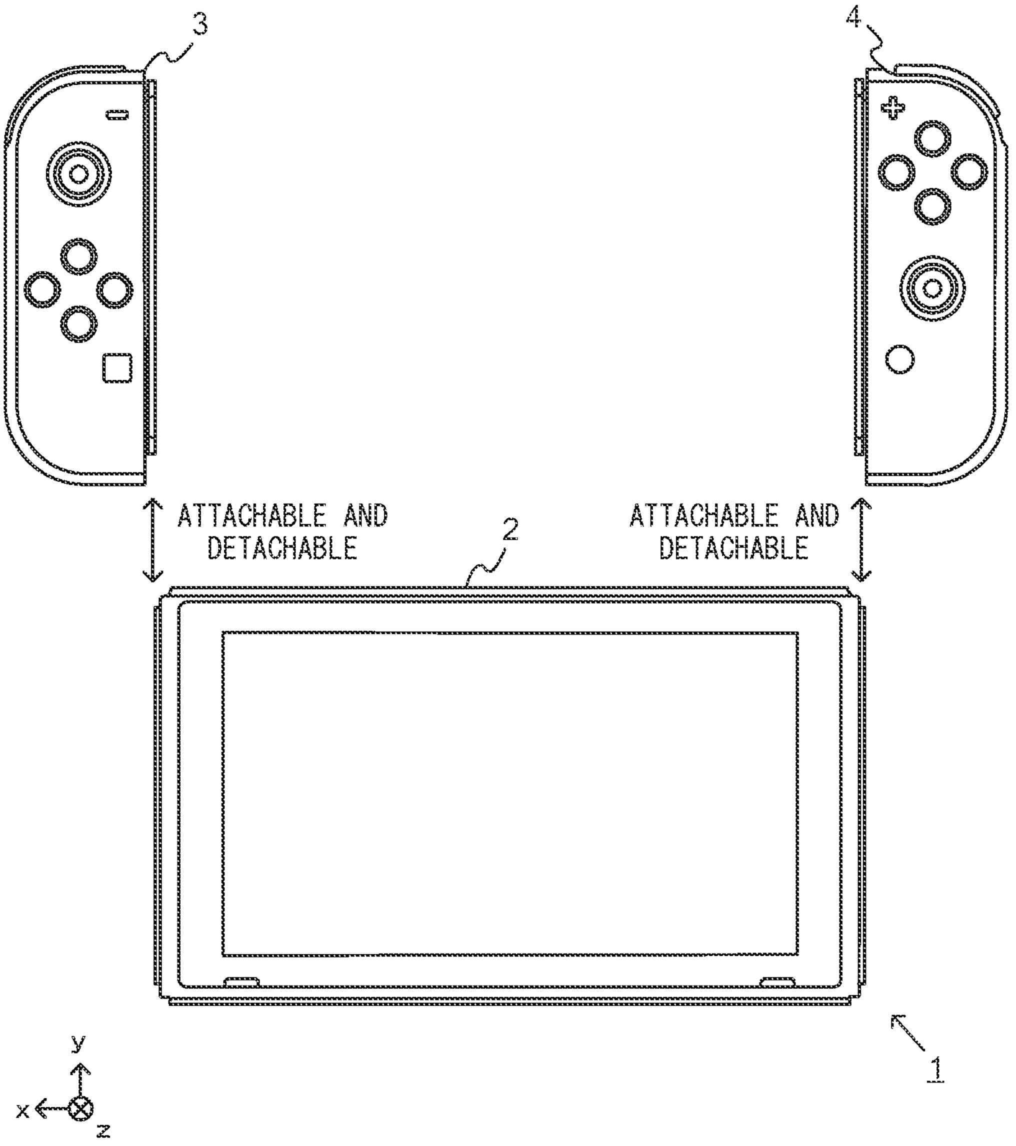
FIG. 2 is a diagram illustrating a non-limiting example of a state in which a left controller 3 and a right controller 4 are detached from a main body apparatus 2.

FIG. 2 is a diagram illustrating an example of a state in which each of the left controller 3 and the right controller 4 is detached from the main body apparatus 2. As illustrated in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
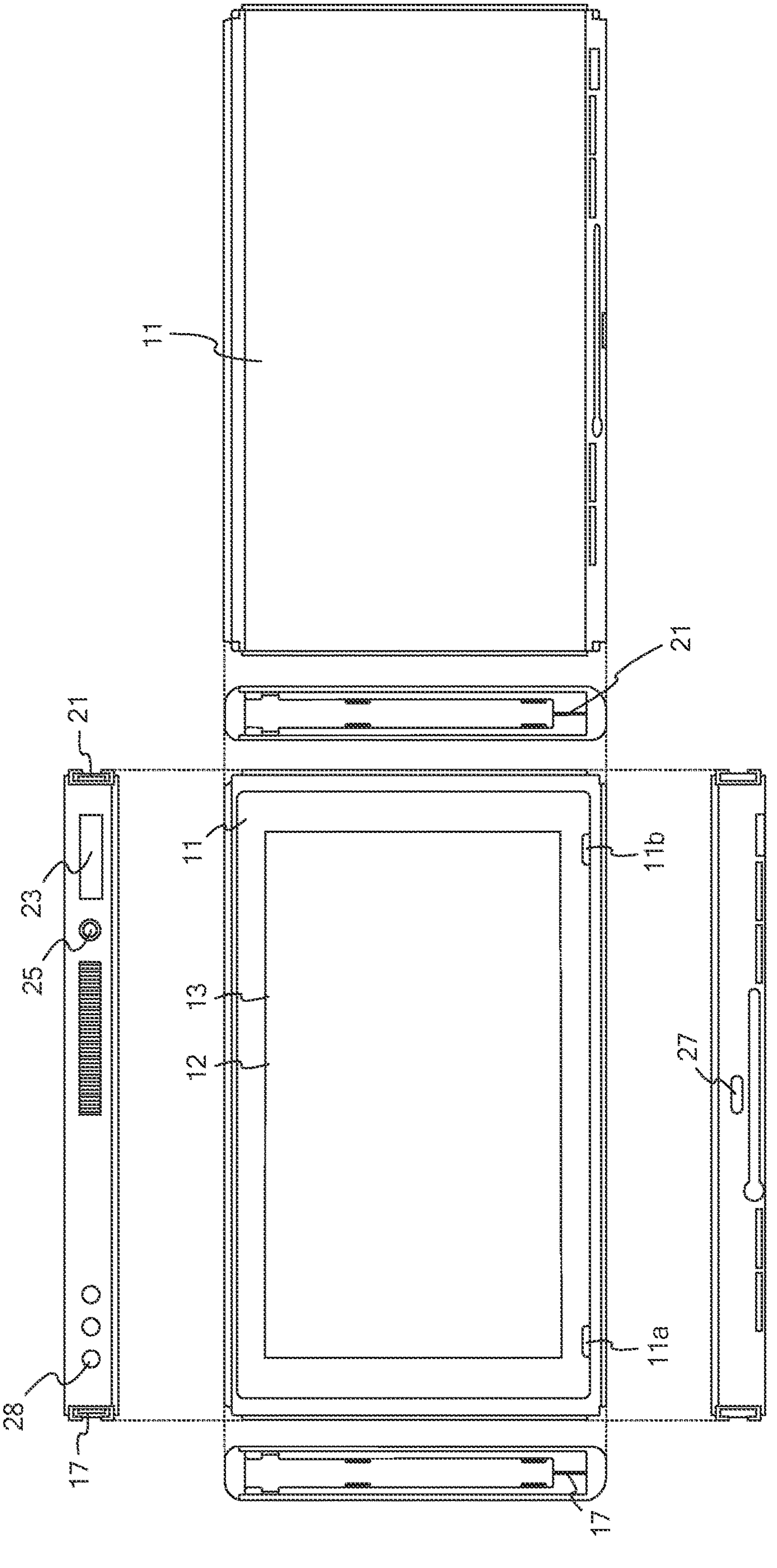
FIG. 3 illustrates six orthogonal views of a non-limiting example of a main body apparatus 2.

FIG. 3 illustrates six orthogonal views of an example of the main body apparatus 2. As illustrated in FIG. 3, the main body apparatus 2 includes an approximately plate-shaped housing 11. In the present example, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As illustrated in FIG. 3, the main body apparatus 2 includes the display 12, which is provided on the main surface of the housing 11. The display 12 displays an image generated by the main body apparatus 2. In the present example, the display 12 is a liquid crystal display device (LCD). The display 12, however, may be a display device of any suitable type.

In addition, the main body apparatus 2 includes a touch panel 13 on the screen of the display 12. In the present example, the touch panel 13 allows multi-touch input (e.g., a capacitive touch panel). It should be noted that the touch panel 13 may be of any suitable type, e.g., it allows single-touch input (e.g., a resistive touch panel).

The main body apparatus 2 includes a speaker (i.e., a speaker 88 illustrated in FIG. 6) inside the housing 11. As illustrated in FIG. 3, speaker holes 11*a* and 11*b* are formed in the main surface of the housing 11. The speaker 88 outputs sounds through the speaker holes 11*a* and 11*b*.

The main body apparatus 2 also includes a left-side terminal 17 that enables wired communication between the main body apparatus 2 and the left controller 3, and a right-side terminal 21 that enables wired communication between the main body apparatus 2 and the right controller 4.

As illustrated in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower-side terminal 27. The lower-side terminal 27 allows the main body apparatus 2 to communicate with a cradle. In the present example, the lower-side terminal 27 is a USB connector (more specifically, a female connector). When the unified apparatus or the main body apparatus 2 alone is placed on the cradle, the game system 1 can display, on a stationary monitor, an image that is generated and output by the main body apparatus 2. Also, in the present example, the cradle has the function of charging the unified apparatus or the main body apparatus 2 alone, being placed thereon. The cradle also functions as a hub device (specifically, a USB hub).

Figure 4:
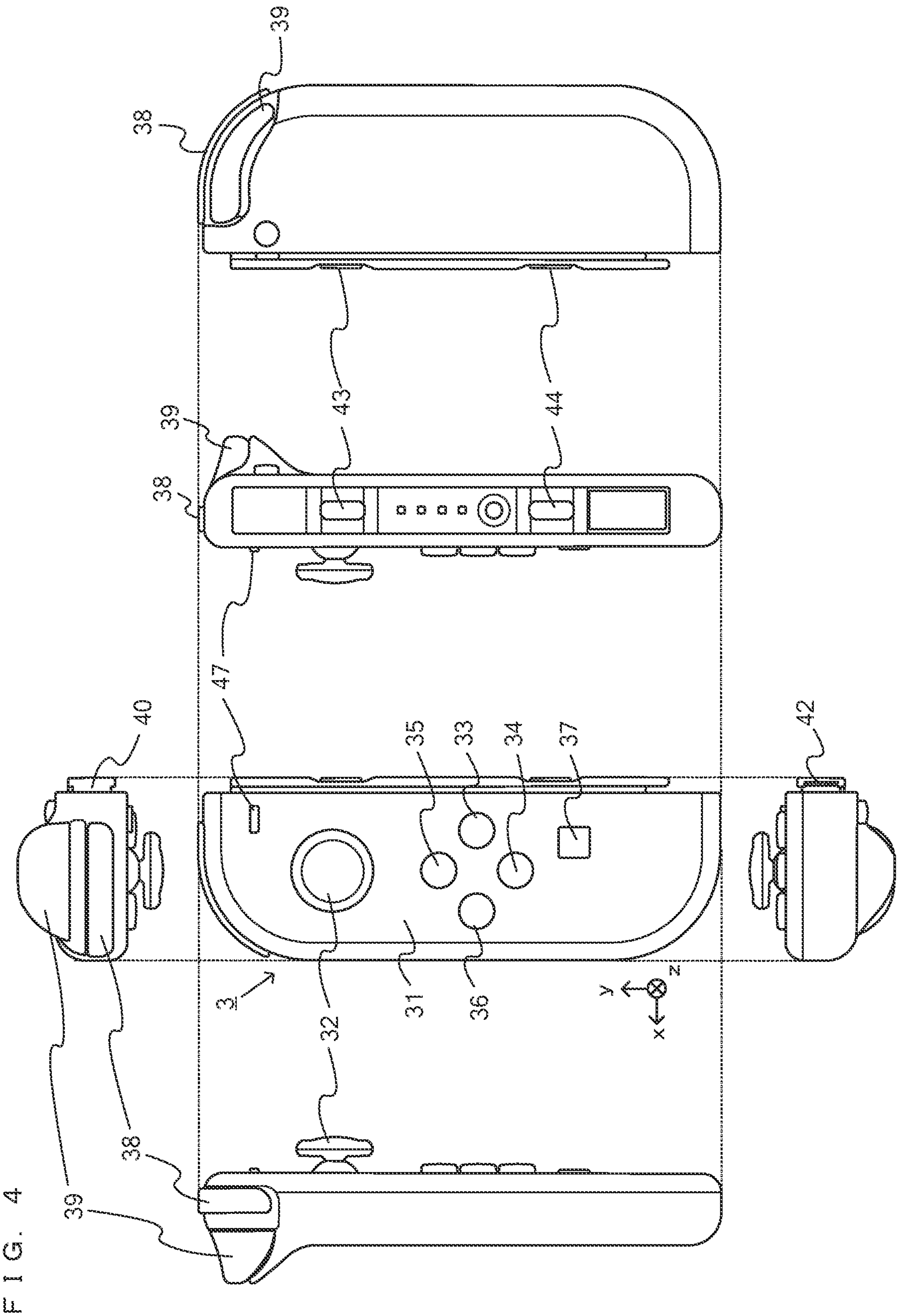
FIG. 4 illustrates six orthogonal views of a non-limiting example of a left controller 3.

FIG. 4 illustrates six orthogonal views of an example of the left controller 3. As illustrated in FIG. 4, the left controller 3 includes a housing 31. In the present example, the housing 31 has a vertically long shape, e.g., is shaped to be long in an up-down direction (i.e., a y-axis direction illustrated in FIGS. 1 and 4). In the state in which the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As illustrated in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the present example, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "–" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

The left controller 3 also includes a terminal 42 that enables wired communication between the left controller 3 and the main body apparatus 2.

Figure 5:
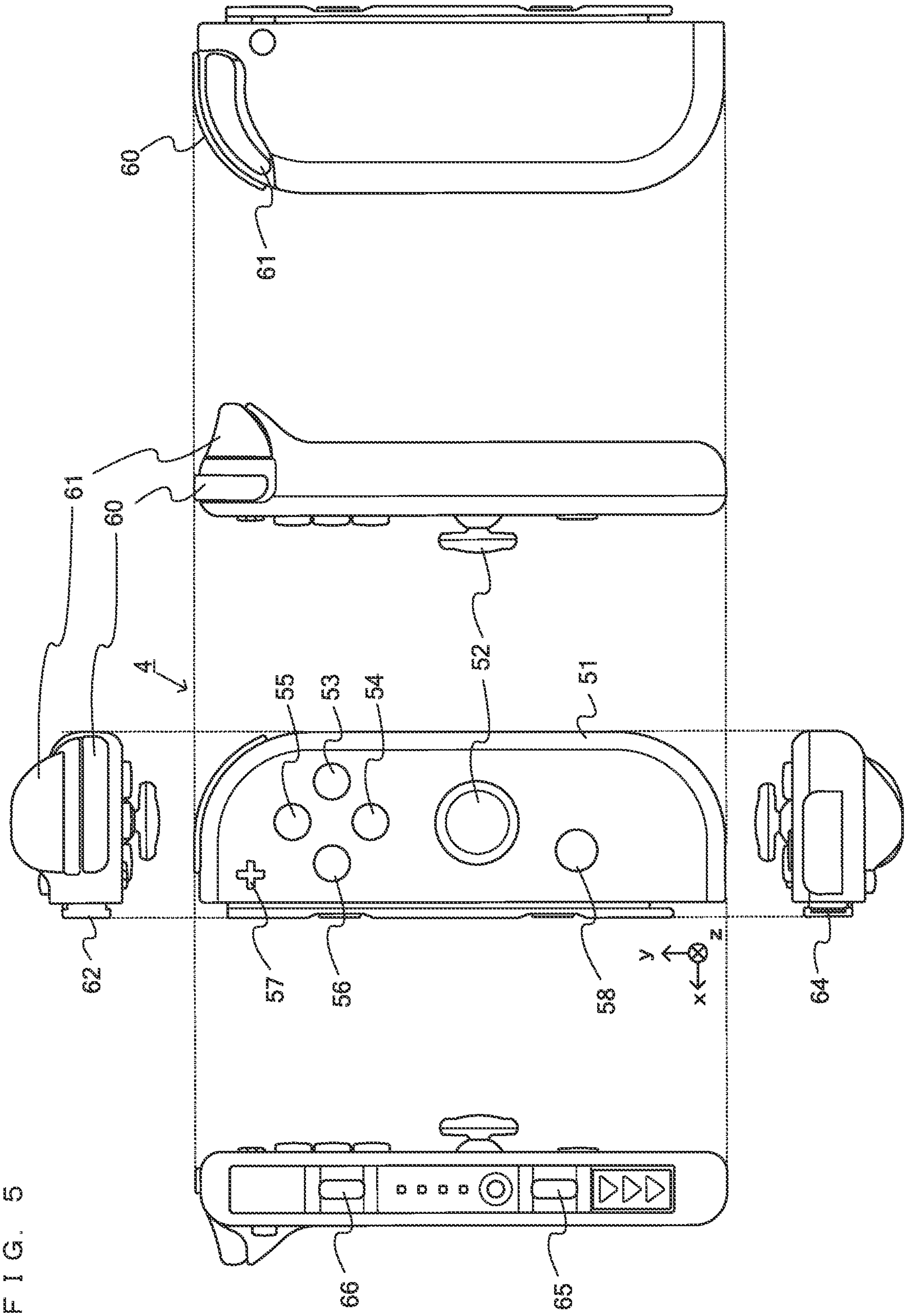
FIG. 5 illustrates six orthogonal views of a non-limiting example of a right controller 4.

FIG. 5 illustrates six orthogonal views of an example of the right controller 4. As illustrated in FIG. 5, the right controller 4 includes a housing 51. In the present example, the housing 51 has a vertically long shape, e.g., is shaped to be long in the up-down direction. In the state in which the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the present example, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for allowing the right controller 4 to perform wired communication with the main body apparatus 2.

Figure 6:
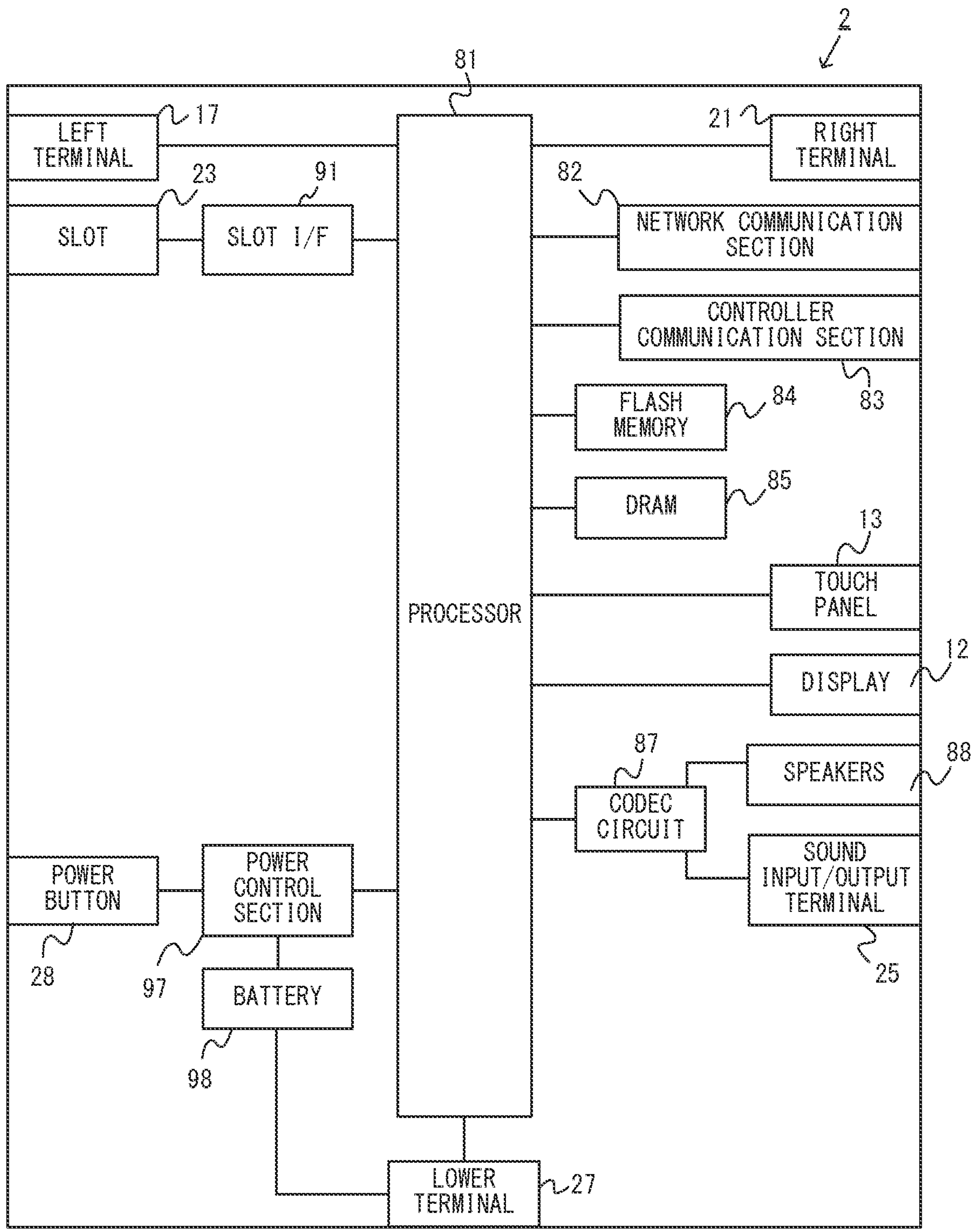
FIG. 6 is a block diagram illustrating a non-limiting example of an internal configuration of a main body apparatus 2.

FIG. 6 is a block diagram illustrating an example of an internal configuration of the main body apparatus 2. The main body apparatus 2 includes components 81 to 91, 97, and 98 illustrated in FIG. 6 in addition to the components illustrated in FIG. 3. Some of the components 81 to 91, 97, and 98 may be implemented as electronic parts on an electronic circuit board, which is contained in the housing 11.

The main body apparatus 2 includes a processor 81. The processor 81 is an information processor for executing various types of information processing to be executed by the main body apparatus 2. For example, the CPU 81 may include only a central processing unit (CPU), or may be a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are connected to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is connected to the processor 81. The network communication section 82 communicates (specifically, through wireless communication) with an external apparatus via a network. In the present example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a particular protocol or infrared light communication). It should be noted that the wireless communication in the above second communication form achieves the function of allowing so-called "local communication", in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is connected to the processor 81. The controller communication section 83 wirelessly communicates with the left controller 3 and/or the right controller 4. The main body apparatus 2 may communicate with the left and right controllers 3 and 4 using any suitable communication method. In the present example, the controller communication section 83 performs communication with the left and right controllers 3 and 4 in accordance with the Bluetooth (registered trademark) standard.

The processor 81 is connected to the left-side terminal 17, the right-side terminal 21, and the lower-side terminal 27. When performing wired communication with the left controller 3, the processor 81 transmits data to the left controller 3 via the left-side terminal 17 and also receives operation data from the left controller 3 via the left-side terminal 17. Further, when performing wired communication with the right controller 4, the processor 81 transmits data to the right controller 4 via the right-side terminal 21 and also receives operation data from the right controller 4 via the right-side terminal 21. Further, when communicating with the cradle, the processor 81 transmits data to the cradle via the lower-side terminal 27. As described above, in the present example, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of left and right controllers 3 and 4. As an example, a first user can provide an input to the main body apparatus 2 using a first set of left and right controllers 3 and 4, and at the same time, a second user can provide an input to the main body apparatus 2 using a second set of left and right controllers 3 and 4.

Further, the display 12 is connected to the processor 81. The processor 81 displays, on the display 12, a generated image (e.g., an image generated by executing the above information processing) and/or an externally obtained image.

The main body apparatus 2 includes a codec circuit 87 and speakers (specifically, a left speaker and a right speaker) 88. The codec circuit 87 is connected to the speakers 88 and an audio input/output terminal 25 and also connected to the processor 81. The codec circuit 87 is for controlling the input and output of audio data to and from the speakers 88 and the sound input/output terminal 25.

The main body apparatus 2 includes a power control section 97 and a battery 98. The power control section 97 is connected to the battery 98 and the processor 81. Further, although not illustrated, the power control section 97 is connected to components of the main body apparatus 2 (specifically, components that receive power supplied from the battery 98, the left-side terminal 17, and the right-side terminal 21). Based on a command from the processor 81, the power control section 97 controls the supply of power from the battery 98 to each of the above components.

Further, the battery 98 is connected to the lower-side terminal 27. When an external charging device (e.g., the cradle) is connected to the lower-side terminal 27, and power is supplied to the main body apparatus 2 via the lower-side terminal 27, the battery 98 is charged with the supplied power.

Figure 7:
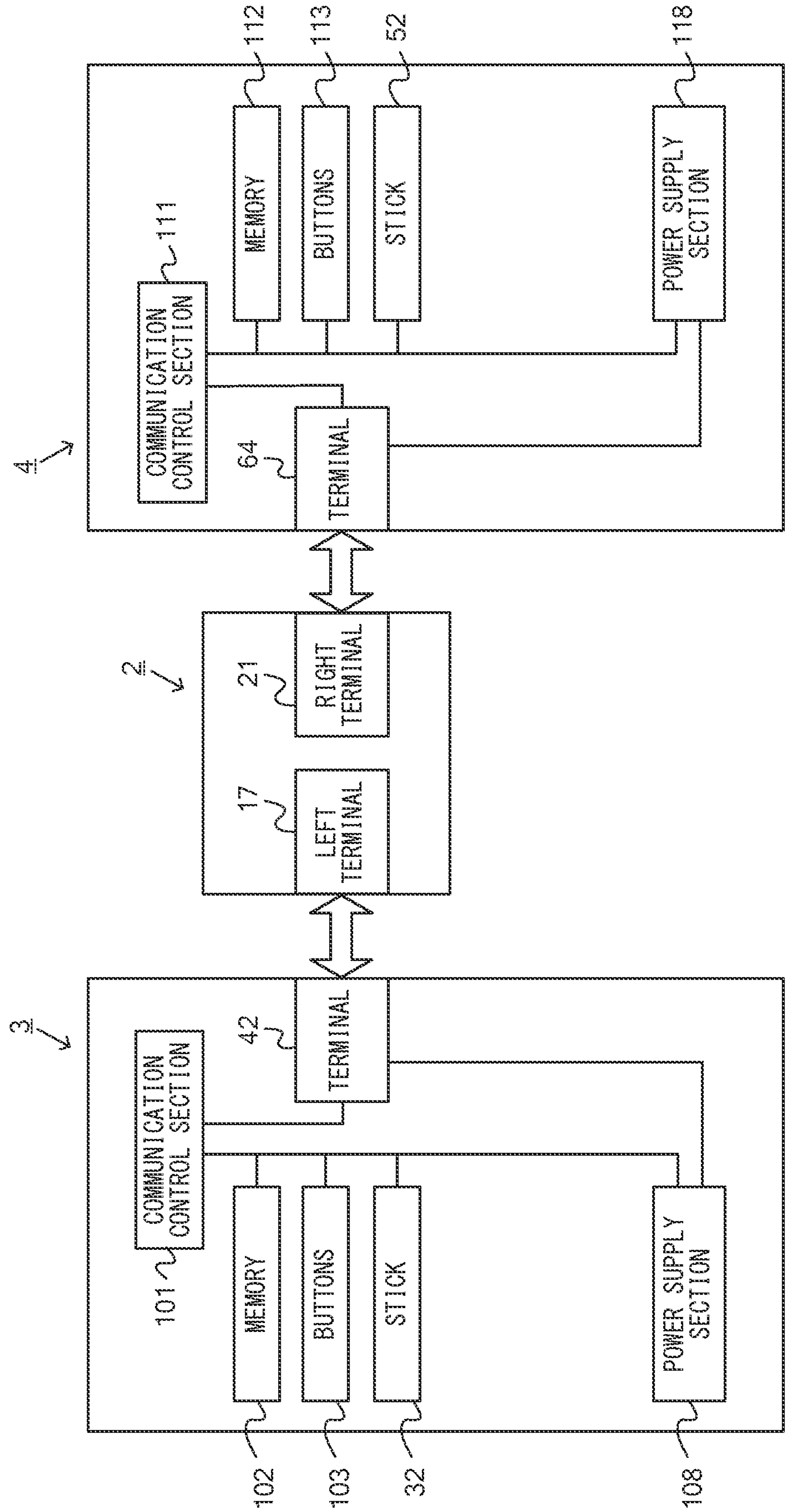
FIG. 7 is a block diagram illustrating a non-limiting example of an internal configuration of a game system 1.

FIG. 7 is a block diagram illustrating examples of the internal configurations of the main body apparatus 2, the left controller 3, and the right controller 4. It should be noted that the details of the internal configuration of the main body apparatus 2 are illustrated in FIG. 6 and therefore are omitted in FIG. 7.

The left controller 3 includes a communication control section 101, which communicates with the main body apparatus 2. As illustrated in FIG. 7, the communication control section 101 is connected to components including the terminal 42. In the present example, the communication control section 101 can communicate with the main body apparatus 2 through both wired communication via the terminal 42 and wireless communication without via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 obtains information regarding an input (specifically, information regarding an operation or the detection result of the sensor) from each of input sections (specifically, the buttons 103 and the analog stick 32). The communication control section 101 transmits operation data including the obtained information (or information obtained by performing predetermined processing on the obtained information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the present example, the power supply section 108 includes a battery and a power control circuit. Although not illustrated in FIG. 7, the power control circuit is connected to the battery and also connected to components of the left controller 3 (specifically, components that receive power supplied from the battery).

As illustrated in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, a communication control section 111 can communicate with the main body apparatus 2 through both wired communication via the terminal 64 and wireless communication without via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

As described above, in the game system 1 of the present example, the left controller 3 and the right controller 4 are removable from the main body apparatus 2. In addition, when the unified apparatus obtained by attaching the left controller 3 and the right controller 4 to the main body apparatus 2 or the main body apparatus 2 alone is attached to the cradle, an image (and sound) can be output on an external display device, such as a stationary monitor or the like. The game system 1 will be described below according to an embodiment in which an image is displayed on the display 12. It should be noted that in the case in which the game system 1 is used in an embodiment in which an image is displayed on the display 12, the game system 1 may be used with the left controller 3 and the right controller 4 attached to the main body apparatus 2 (e.g., the main body apparatus 2, the left controller 3, and the right controller 4 are integrated in a single housing).

A game is played using a virtual space displayed on the display 12, according to operations performed on the operation buttons and sticks of the left controller 3 and/or the right controller 4, or touch operations performed on the touch panel 13 of the main body apparatus 2, in the game system 1. In the present example, as an example, a game can be played in which a player character PC is moved in a virtual space according to the user's operation performed using the operation buttons, the sticks, and the touch panel 13.

Figure 8:
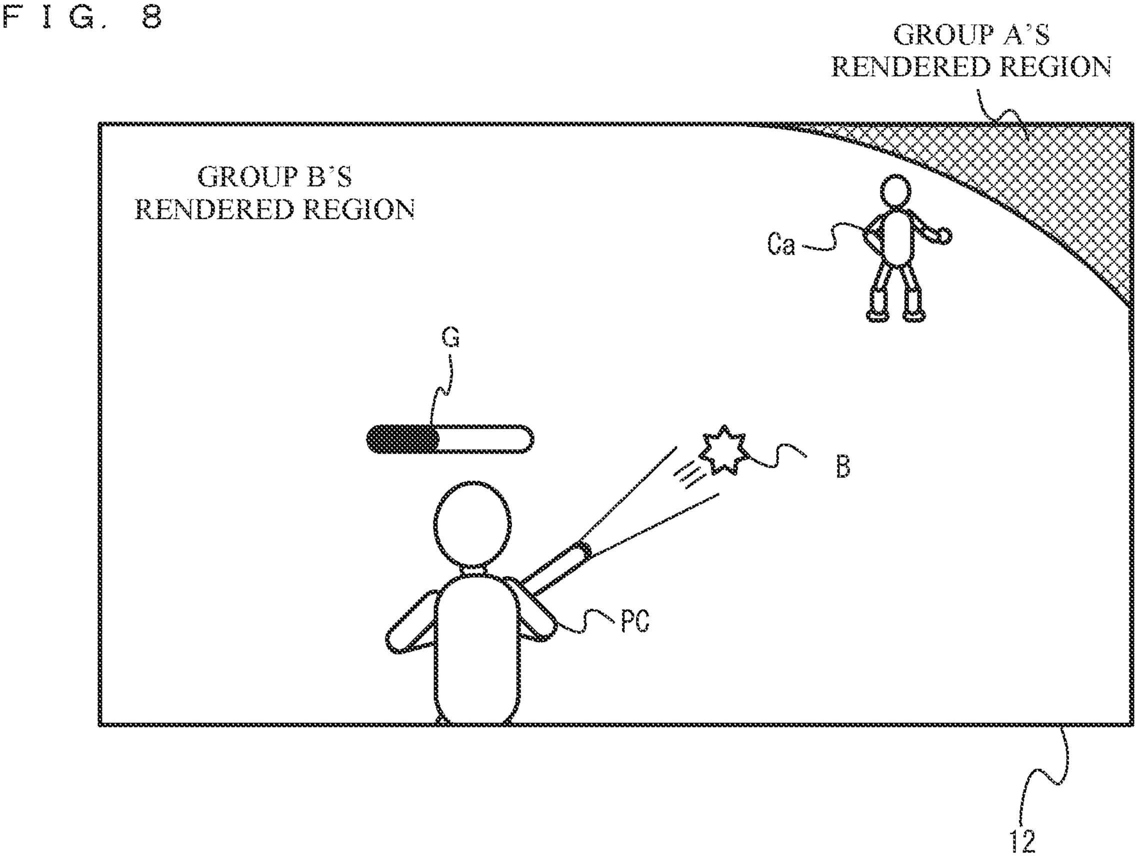
FIG. 8 is a diagram illustrating a non-limiting example of a game image in a first phase in which a player character PC attacks a character Ca in a virtual space.
Figure 9:
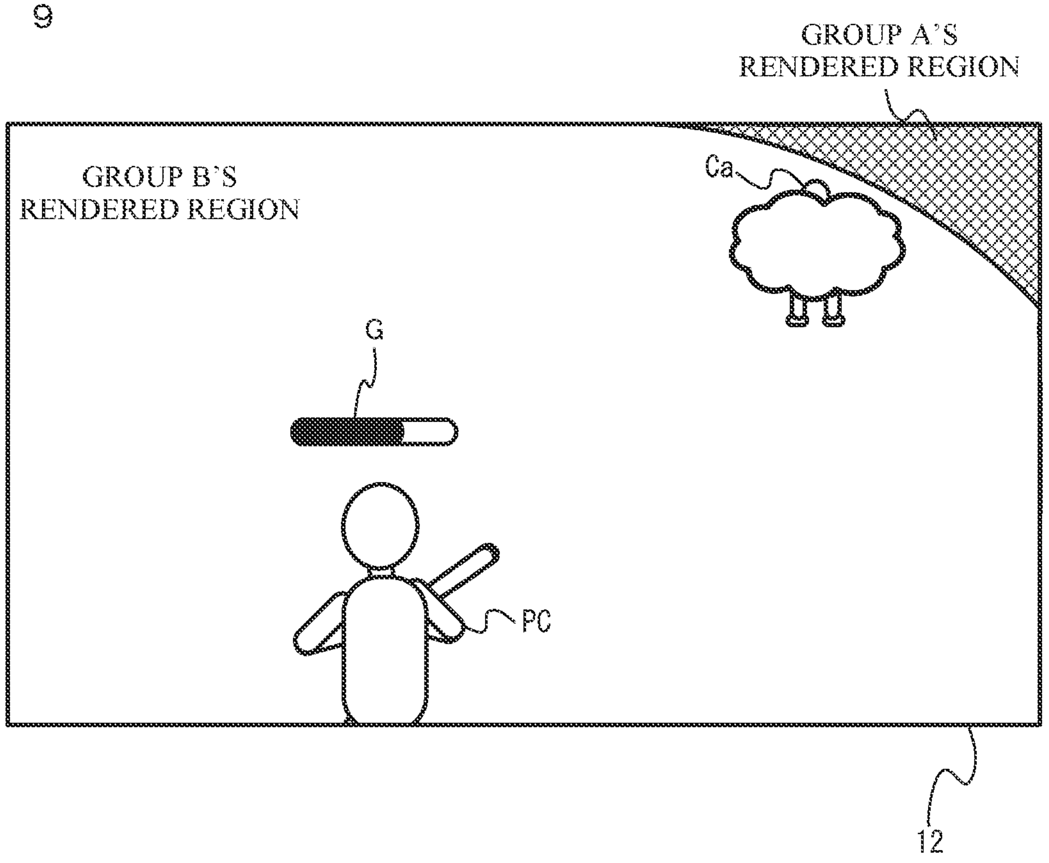
FIG. 9 is a diagram illustrating a non-limiting example of a game image in a second phase in which a player character PC attacks a character Ca in a virtual space.
Figure 10:
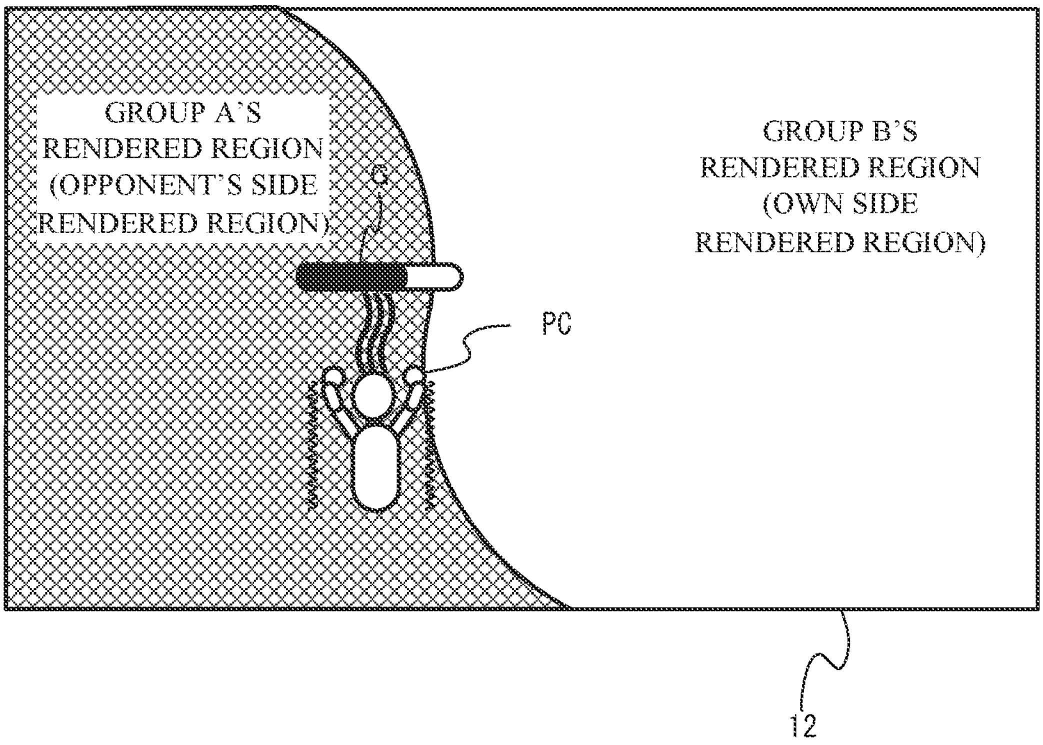
FIG. 10 is a diagram illustrating a non-limiting example of a game image in which a player character PC performs an action in an opponent's side rendered region.
Figure 11:
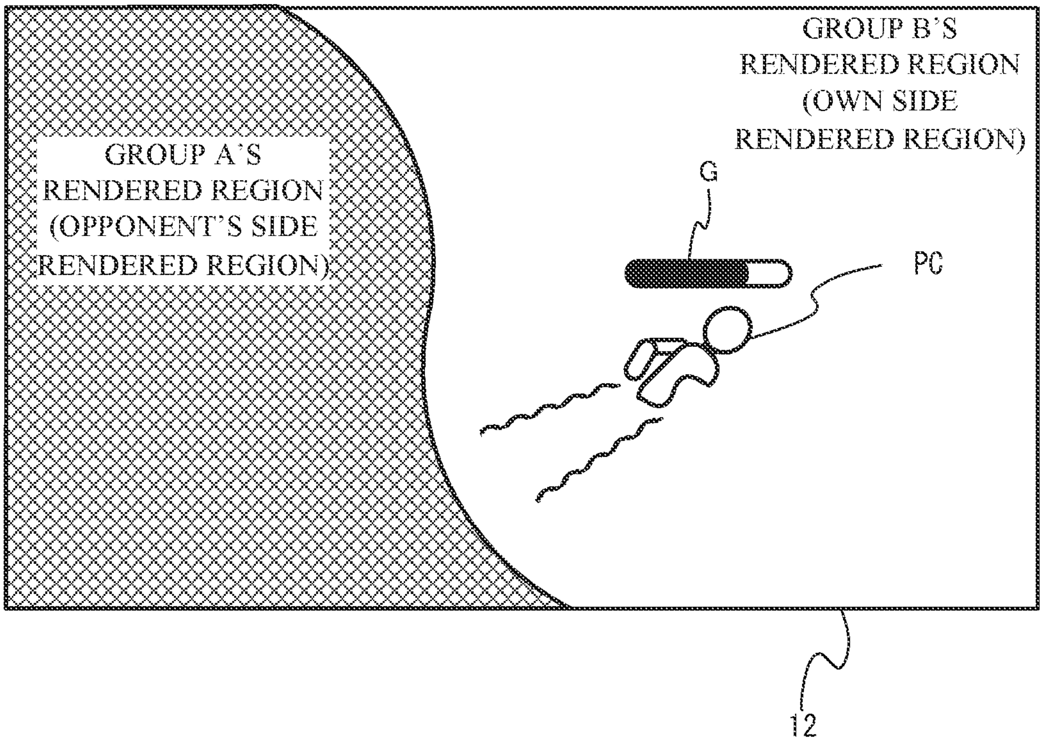
FIG. 11 is a diagram illustrating a non-limiting example of a game image in which a player character PC performs an action in their own side rendered region.
Figure 12:
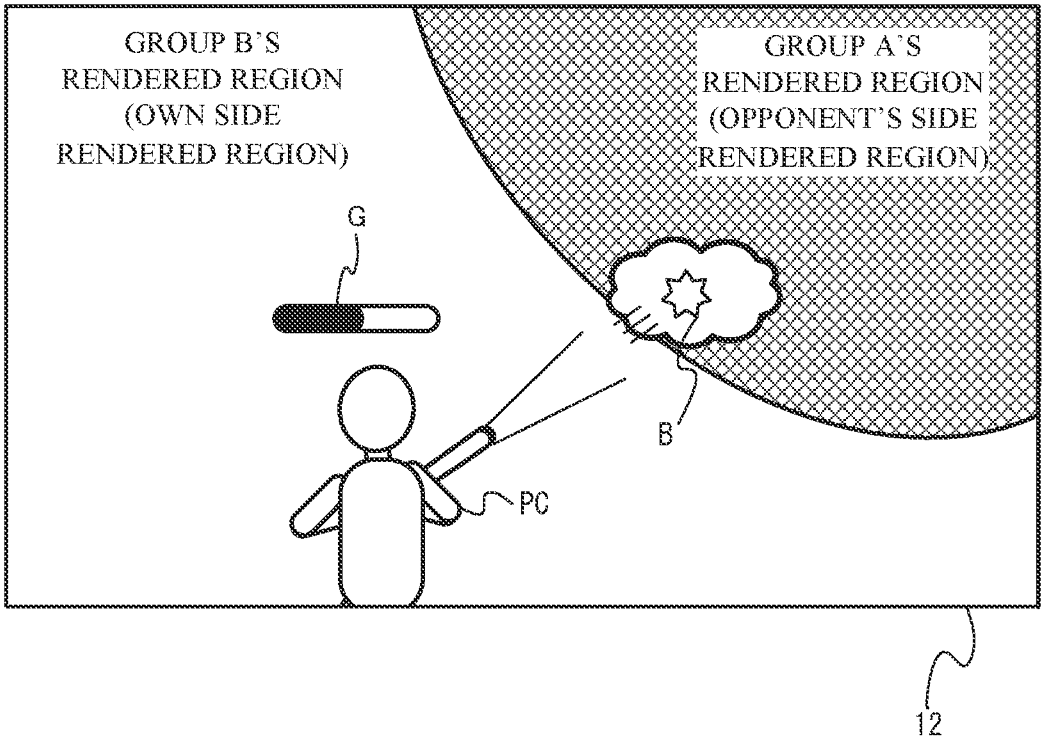
FIG. 12 is a diagram illustrating a non-limiting example of a game image showing a first phase of a player character PC's action of increasing their own side rendered region in a virtual space.
Figure 13:
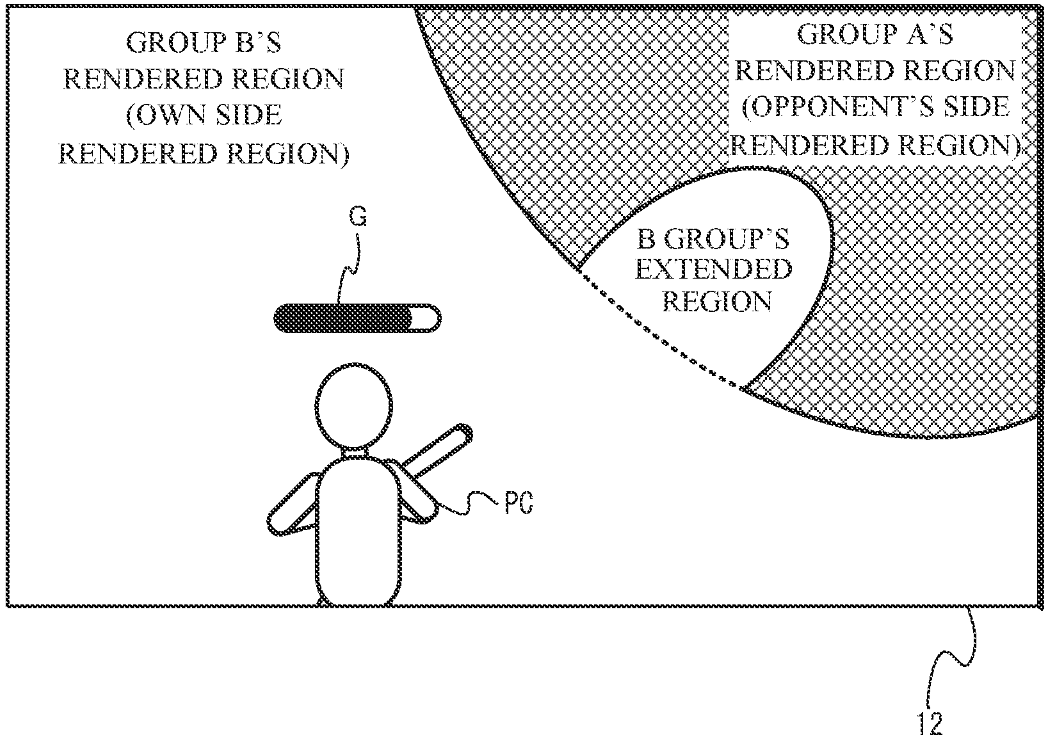
FIG. 13 is a diagram illustrating a non-limiting example of a game image showing a second phase of a player character PC's action of increasing their own side rendered region in a virtual space.

The game rules of a game process that is executed in the game system 1 will be outlined with reference to FIGS. 8 to 13. It should be noted that FIG. 8 is a diagram illustrating an example of a game image in a first phase in which a player character PC attacks a character Ca in a virtual space. FIG. 9 is a diagram illustrating an example of a game image in a second phase in which a player character PC attacks a character Ca in a virtual space. FIG. 10 is a diagram illustrating an example of a game image in which a player character PC performs an action in an opponent's side rendered region. FIG. 11 is a diagram illustrating an example of a game image in which a player character PC performs an action in their own side rendered region. FIG. 12 is a diagram illustrating an example of a game image showing a first phase of a player character PC's action of increasing their own side rendered region in a virtual space. FIG. 13 is a diagram illustrating an example of a game image showing a second phase of a player character PC's action of increasing their own side rendered region in a virtual space.

The network communication section 82 of the main body apparatus 2 transmits various pieces of data to other game systems 1 through a communication network such as the Internet, and receives data transmitted from other game systems 1 through the communication network. In a game of the present example, respective groups of a player character PC (the user's own character) and the user's opponent characters (opponent characters) are associated with different colors. In the competition game, in the three-dimensional virtual space, the player character PC is operated to paint a game stage in a color corresponding to the group to which the player character PC belongs, while opponent characters also each similarly paint the game stage in a color corresponding to the group to which the opponent character belongs.

The player character PC may have at least one friendly character that is operated by another user(s). In that case, the player character PC and the friendly character constitute a group, and the same color corresponds to the player character PC and the friendly character, which belong to the same group. As a result, a plurality of users can perform cooperative play. In addition, an opponent character may have a friendly character(s), and these characters constitute an opponent group, and the same color corresponds to the characters belonging to the opponent group. Individual characters may be separated into three or more groups, and different groups may be associated with different colors.

Opponent characters may be caused to perform an action by operation inputs provided by users operating other communicable game systems 1, or under the control of the CPU based on actions of the player character PC and/or their friendly characters. In the case in which opponent characters are caused to perform an action, based on other users' operation inputs, competition play against other users is embodied. In addition, friendly characters may also be caused to perform an action by operation inputs provided by users operating other communicable game systems 1, or under the control of the CPU based on actions of the player character PC and/or opponent characters. In the case in which friendly characters are caused to perform an action, based on other users' operation inputs, cooperative play with other users is embodied. In any embodiments, individual characters including the player character PC, friendly characters, and opponent characters can be caused to perform an action in the same three-dimensional virtual space.

In FIG. 8, the display 12 shows an image of a game in which two groups, i.e., the group to which the player character PC belongs and the group to which the character Ca belongs, compete with each other on a game stage in the virtual space. The user of the game system 1 can operate the player character PC by operating the entire game system 1 in the above integrated form, operating operation buttons or sticks of the left controller 3 and/or the right controller 4, operating the touch panel 13 of the main body apparatus 2 by touch, and the like. In addition, the character Ca is the above opponent character. As an example, actions of the character Ca are controlled by operations performed by the user of another game system 1 that can communicate with the game system 1. As another example, the character Ca's actions may be automatically controlled by the CPU (e.g., the processor 81).

In the present example, a plurality of characters (including the player character PC) appearing in the virtual space each belong to one of a plurality of groups. In the present example, typically, a game is played in which characters belonging to different groups compete with each other, and a plurality of characters are chosen from characters belonging to each group, and participate in a competition. As an example, there are three groups A, B, and C. In the example illustrated in FIG. 8, a game is played in which a plurality of characters belonging to the group A compete with a plurality of characters belonging to the group B. The character Ca belongs to the group A, and the player character PC belongs to the group B.

For example, the player character PC, which is displayed on the display 12, is caused to perform an attack action according to the user's operation input of pressing down a predetermined operation button. For example, if, when a weapon held by the player character PC is aimed at a character belonging to an opponent group (e.g., the character Ca), a predetermined operation button is pressed down, an attack action of firing a bullet B from the weapon toward that character is performed.

As illustrated in FIG. 9, if the bullet B has hit the character Ca belonging to an opponent group by the player character PC's attack action, the character Ca suffers damage, so that the hit points or the like of the character Ca decrease. If the hit points or the like of the character Ca are zero due to the damage, the character Ca is caused to temporarily disappear from the virtual space, and thereafter, to appear again on a game stage in an appearance region (in this example, an appearance region EAa for the group A described below) for the group to which the character Ca belongs.

The player character PC may be attacked by other characters belonging to opponent groups. If a bullet B has hit the player character PC by another character's attack action, the player character PC suffers damage, so that the hit points or the like of the player character PC decrease. If the hit points or the like of the player character PC are zero due to the damage, the player character PC is caused to temporarily disappear from the virtual space, and thereafter, to appear again on a game stage from an appearance region (in this example, an appearance region EAb for the group B described below) for the group to which the player character PC belongs.

In addition, if an attack on a character belonging to an opponent group has been successful, so that the hit points or the like of the character has decreased, a parameter set for the character that has performed the attack may be increased based on the result of the attack. As a first example, a contribution parameter indicating the degree of contribution to the group to which the character that has performed the attack belongs may be increased. The contribution parameter is for assessing each character in the competition game, and serves as a score for each character at the end of the game. As a second example, a special action parameter that allows the character that has performed the attack to perform a special action in a game that is being played may be increased. If the special action parameter of a character has reached a predetermined value, the character is allowed to perform a special action (e.g., a special attack action). When a character performs a special action, the character gains an advantage in the game. In the present example, as illustrated in FIGS. 8 and 9, a gauge G indicating the current state of the special action parameter is displayed in the vicinity of a character. If the gauge G is full, the character corresponding to the gauge G is allowed to perform a special action according to the user's operation input.

In addition, as illustrated in FIG. 10, characters including the player character PC may suffer damage due to movement in the virtual space. For example, in the present example, a region painted by the group to which the player character PC belongs (referred to as "the player character PC's own side rendered region"), a region painted by an opponent group (referred to as an "opponent's side rendered region"), and a region other than these regions (referred to as a "neutral region") are set on a game field provided in the virtual space. When a character (e.g., the player character PC) enters an opponent's side rendered region that is formed by an opponent group to which the character does not belong, the character suffers predetermined damage. For example, the hit points or the like of the character that has entered an opponent's side rendered region to suffer damage are decreased based on the duration of entry, the number of times of entry, or the like. In addition, when a character (e.g., the character Ca) that does not belong to the group which has painted the player character PC's own side rendered region, enters the player character PC's own side rendered region, the character suffers predetermined damage. For example, the hit points or the like of the character that has entered the player character PC's own side rendered region to suffer damage are decreased based on the duration of entry, the number of times of entry, or the like.

It should be noted that characters including the player character PC may suffer damage due to movement in the virtual space in other situations in addition to the situation that a character enters a region painted by an opponent group. For example, characters may suffer damage and the hit points or the like thereof may be decreased in various situations in the virtual space such as falling, being submerged by water, toppling, being sandwiched, smashing, failing to perform an action, being shocked, and the like.

In addition, when a character including the player character PC is present in a region painted by the group to which the character belongs, the character gains an advantage in the competition game compared to when the character is not present in the region. For example, as illustrated in FIG. 11, in the "player character PC's own side rendered region" rendered on a game field, a character (e.g., the player character PC) belonging to the group that has painted the player character PC's own side rendered region is allowed to move by swimming while hiding. As another example, when a character is present in a region painted by the group to which the character belongs, the character can gain an advantage in the competition game, such as being allowed to move at a movement speed higher than when the character is not present in the region, being less likely to suffer damage due to attack by an opponent group compared to when the character is not present in the region, recovering their hit points or the like, hiding in the region, or the like. Such advantages cannot be obtained in a rendered region painted by an opponent group (e.g., in the rendered region of a side opposing the player character PC) or a neutral region.

In addition, as illustrated in FIGS. 12 and 13, a character including the player character PC may paint a game stage (including objects such as constructions and terrains provided on a game stage, and a game stage including objects thereon is hereinafter simply referred to as a game stage) in a color corresponding to the group to which the character belongs, so that a rendered region can be formed for the group. As an example, in FIGS. 8 to 13, the rendered region of the group B to which the player character PC belongs (the player character PC's own side rendered region) is represented by a white region that is rendered in a color corresponding to the group B. In addition, the rendered region of the group A as an opponent group (opponent's side rendered region) is represented by a hatched region that is rendered in a color corresponding to the group A. It should be noted that a "game stage" in the present example includes a ground, a terrain, and the like in a range in which characters are allowed to move in the virtual space, and also includes constructions, trees, and the like provided on the ground, terrain, and the like. As an example of a process of forming the rendered regions, the game system 1 may perform a process of updating color information of a coordinate point to be painted in a corresponding color in "paint effect texture" for a surface of a game stage.

As illustrated in FIG. 12, a game stage can be painted in a color corresponding to the group to which the player character PC belongs, using the bullet B fired by the player character PC's attack action according to the user's operation input. For example, in the present example, the user operates the player character PC so as to cause a rendering event in which a game stage in the virtual space is painted in a color corresponding to the group to which the player character PC belongs, so that the painted region is rendered in the corresponding color. Specifically, a region in the virtual space that depends on the location or orientation of the player character PC, or the type of a rendering event (the type of a tool or weapon that is used) is rendered and painted in a color corresponding to the group to which the player character PC belongs. In the present example, examples of rendering events include firing a weapon and painting using a tool.

In the above firing a weapon, when an ink is fired from the location of the player character PC as a starting point in a direction in which the player character PC faces, a region in which the ink lands is painted in the ink. For example, in the example illustrated in FIG. 12, when the bullet B hits another object or a game stage, an ink having a corresponding color that forms the bullet B is scattered or spread around the landing point thereof, so that painting can be achieved in the ink having a corresponding color. The above firing a weapon may be performed in a plurality of firing methods. The firing direction may be able to be horizontally and vertically adjusted according to an operation input. The firing strength may also be able to be adjusted according to an operation input. It should be noted that an ink may be fired continuously in the form of bullets by firing a weapon. An ink may be fired in the virtual space in various manners such as being fired linearly or radially, and being scattered or spread around the player character PC.

In the above firing a weapon, when an ink is fired toward a character of an opponent group, the attack is successful if the fired ink hits the character. If the attack is successful, the ink is scattered or spread around the attacked character. As a result, a game stage around the attacked character is painted in a color corresponding to the group to which the attacking character belongs. Thus, a character is allowed to extend a rendered region of a color corresponding to the group to which the character belongs, by performing an attack action against a character belonging to an opponent group.

In the above painting with a tool, by the player character PC moving in the virtual space, an ink having a color corresponding to the group to which the player character PC belongs is applied over a width (e.g., the width of a roller or brush) depending on the tool's painting ability in the movement direction.

The player character PC is allowed to extend the rendered region of the group to which the player character PC belongs (the player character PC's side rendered region) by painting a rendered region painted by an opponent group (opponent's side rendered region) or a neutral region in an ink corresponding to the group to which the player character PC belongs. For example, in the virtual space, a rendered region painted in a color corresponding to one group can be repainted by overpainting in a color corresponding to another group. Specifically, a game stage in the virtual space is rendered in a color last applied, i.e., even a rendered region painted in a color corresponding to an opponent group is changed into a color corresponding to the group to which the player character PC belongs by overpainting, or vice versa.

For example, as illustrated in FIGS. 12 and 13, when the player character PC fires the bullet B toward an opponent's side rendered region (the group A's rendered region) using a weapon, so that the bullet B is released into the opponent's side rendered region on a game stage, an ink having a corresponding color forming the bullet B is scattered or spread around the landing point thereof in the opponent's side rendered region. As a result, the opponent's side rendered region around the landing point is overpainted in a color corresponding to the group B. The region overpainted in a color corresponding to the group B is removed from the group A's rendered region and changed into the group B's rendered region, so that the rendered region painted by the group to which the player character PC belongs can be extended.

In the present example, when the rendered region of the group to which a character belongs is extended by the character's rendering event, a parameter set for the character performing the rendering event may be increased based on the extended area. As a first example, the contribution parameter indicating the degree of contribution to the group to which the character performing the rendering event belongs may be increased based on the extended area. As a second example, the special action parameter set for the group to which the character performing the rendering event belongs may be increased based on the extended area. It should be noted that the parameters may be increased for only the character performing the rendering event or all characters belonging to the same group as that of the character performing the rendering event.

In addition, as one condition under which a group wins, the area or location of a rendered region may be used. As an example condition under which a group wins, a group that has a larger rendered region after a predetermined period of time has passed since the start of a competition game may be a winner. As another example condition under which a group wins, a group that has continued to possess a predetermined region on a game stage as their own rendered region for at least a predetermined period of time may be a winner. Thus, by setting a condition under which a rendered region painted on a game stage is directly linked with the win/loss of a group, the importance of the rendering event performed by the player character PC can be increased.

In addition, as another example condition under which a group wins, a group for which a vehicular object capable of carrying a character has reached an opponent group's goal may be a winner. In addition, a group for which a portable object capable of being carried by a character has been brought to an opponent group's goal may be a winner. Still alternatively, a group that has put a greater number of collectable objects spread over a game stage into an opponent group's goal may be a winner.

Figure 14:
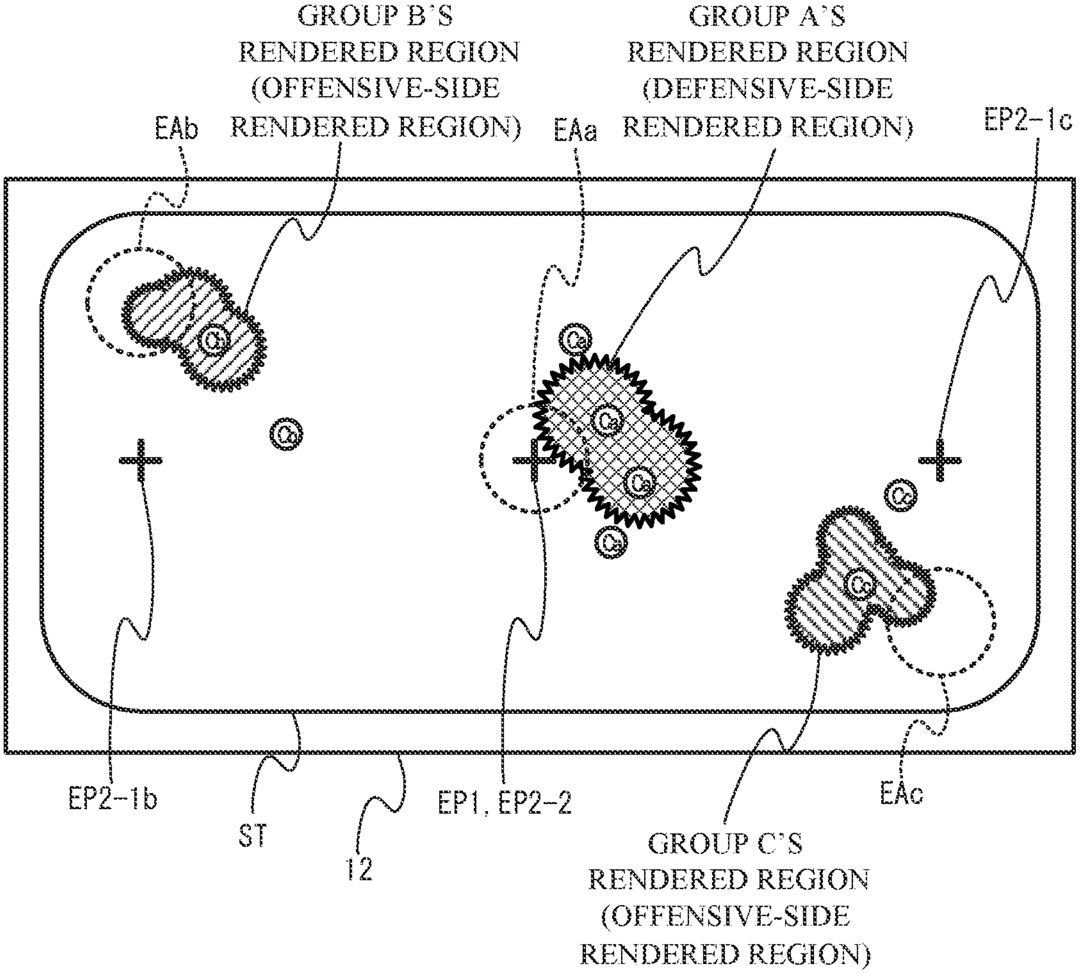
FIG. 14 is a diagram illustrating a non-limiting example of a bird's eye view image of a competition game that is performed by three participating groups.
Figure 15:
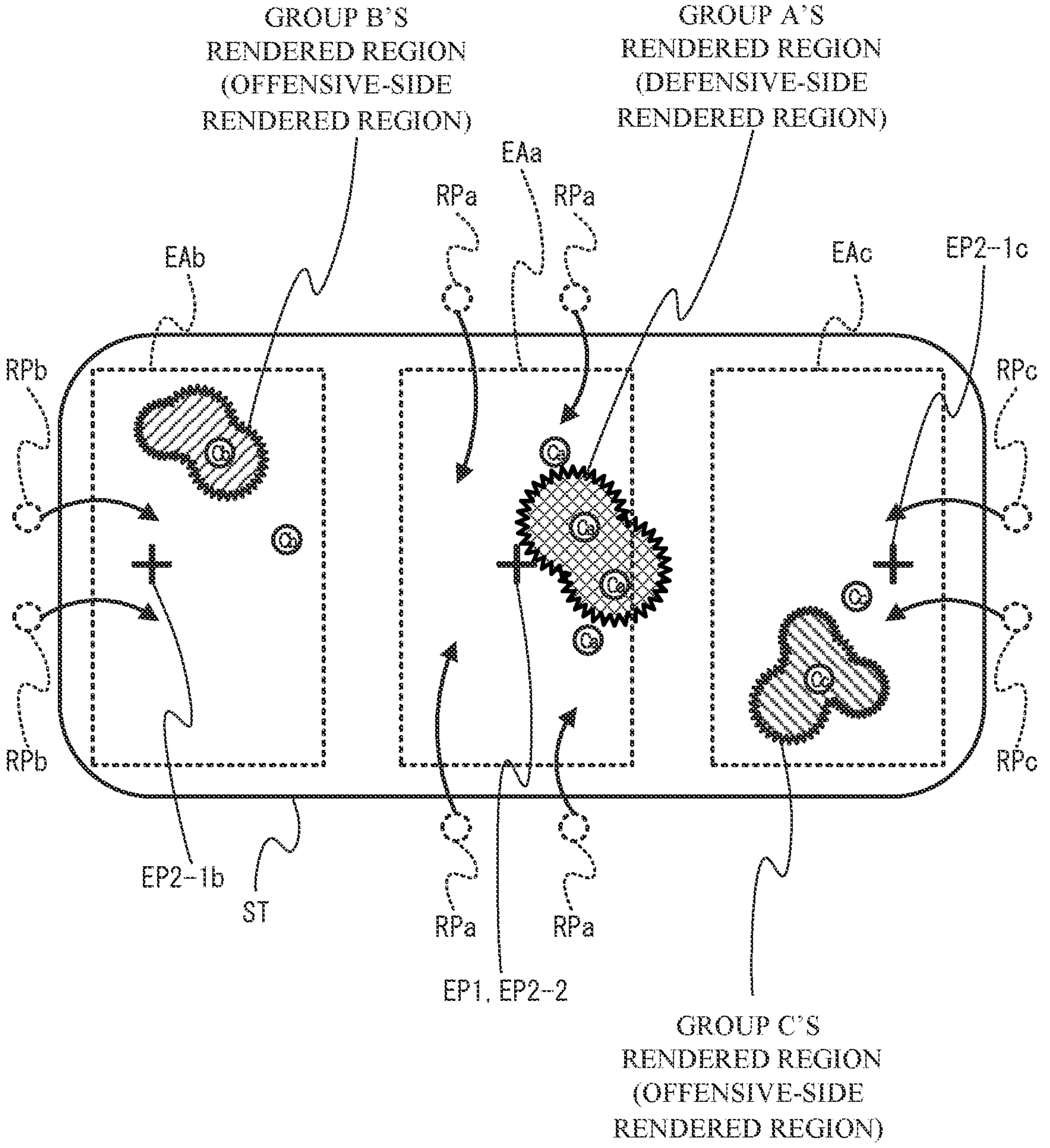
FIG. 15 is a diagram for describing another non-limiting example of an appearance region EA.
Figure 16:
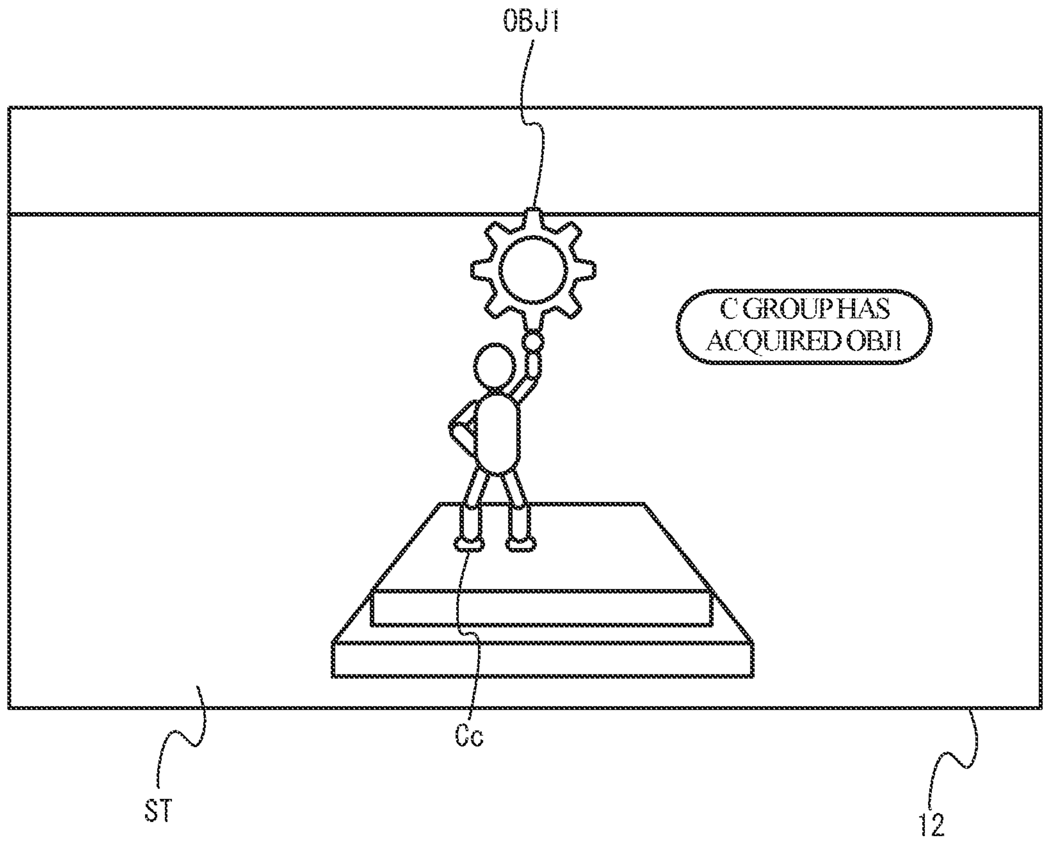
FIG. 16 is a diagram illustrating a non-limiting example of a game image in a player character PC performs an action of obtaining a first object OBJ1 in a virtual space.
Figure 17:
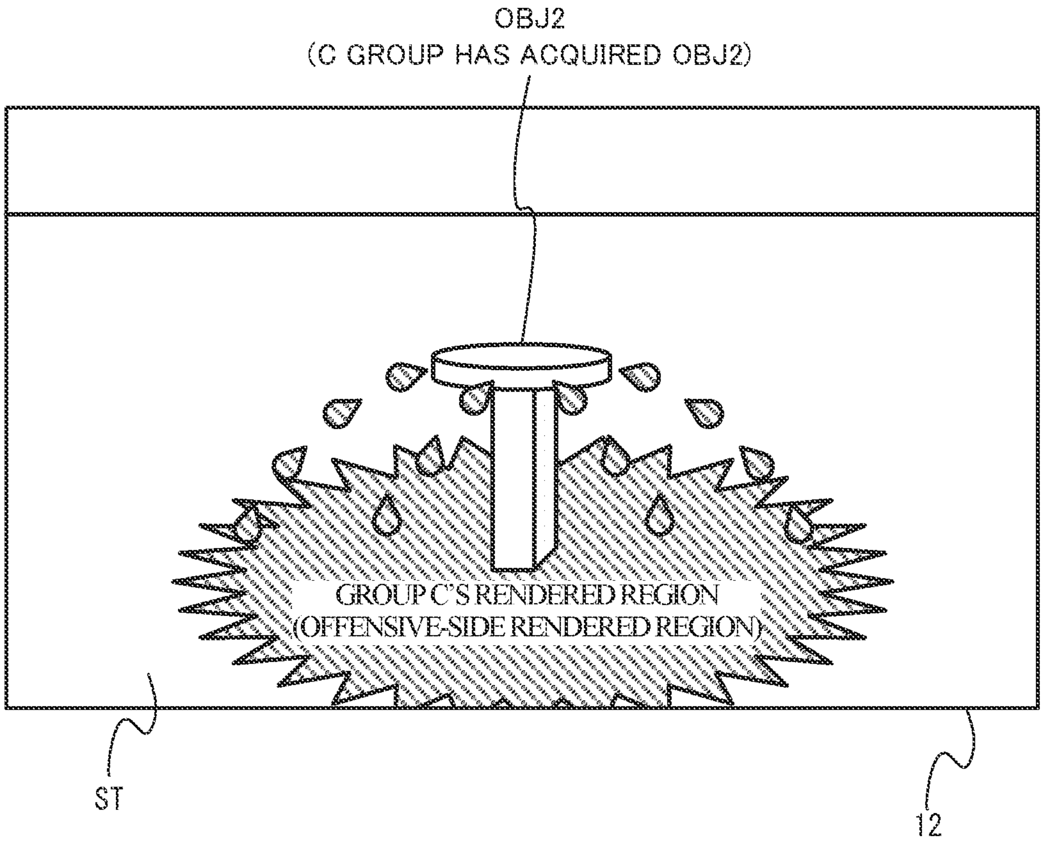
FIG. 17 is a diagram illustrating a non-limiting example of a game image in which a second object OBJ2 is disposed in a virtual space.
Figure 18:
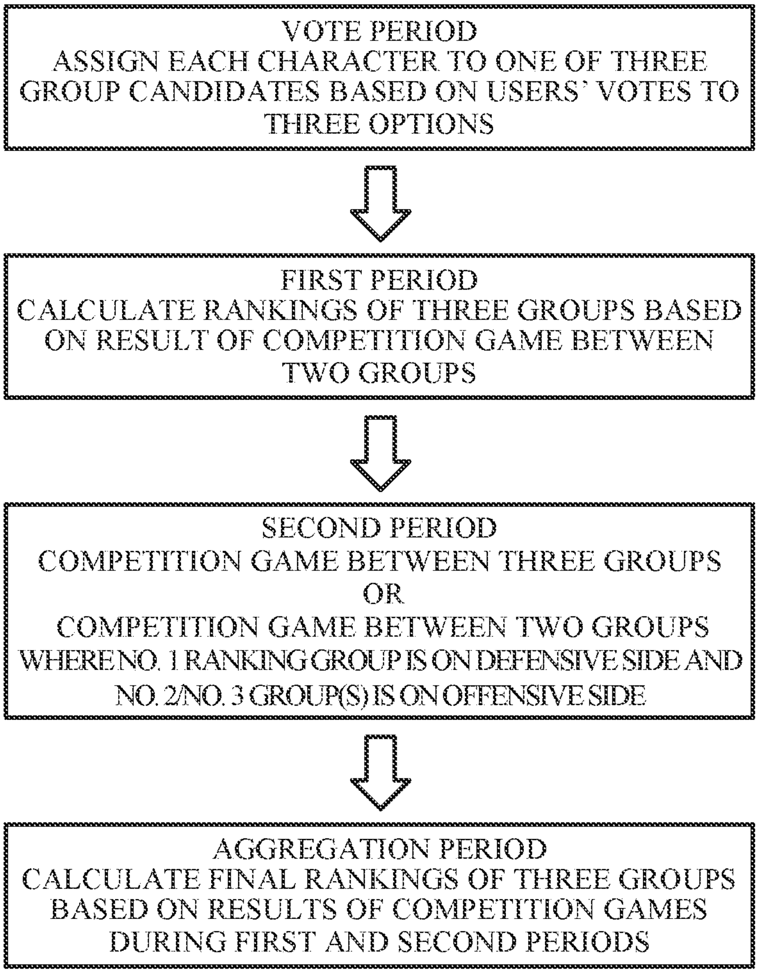
FIG. 18 is a diagram illustrating a non-limiting example of a flow in which a competition game proceeds.

A game process that is performed by three participating groups in the game system 1 will be outlined with reference to FIGS. 14 to 18. It should be noted that FIG. 14 is a diagram illustrating an example of a bird's eye view image of a competition game that is performed by three participating groups. FIG. 15 is a diagram for describing another example of the appearance region EA. FIG. 16 is a diagram illustrating an example of a game image in a player character PC performs an action of obtaining a first object OBJ1 described below in a virtual space. FIG. 17 is a diagram illustrating an example of a game image in which a second object OBJ2 described below is disposed in a virtual space. FIG. 18 is a diagram illustrating an example of a flow in which a competition game proceeds.

In FIG. 14, a game is being played in which three groups compete with each other on a game stage ST in a virtual space. In the present example, one defensive-side group (a group A) competes with two cooperating, offensive-side groups (groups B and C) in a competition game. It should be noted that in the present example, according to the user's operation input in the competition game, the rendered state of each group in a color corresponding to the group in the entire virtual space at that time is displayed. As an example, a bird's eye view image of the entire game stage ST is displayed as illustrated in FIG. 14. In addition to the bird's eye view image of the competition game illustrated in FIG. 14, the area of the rendered region of each group may be represented by a graph or numerical value.

The competition game rules described above with reference to FIGS. 8 to 13 are similarly applied to the competition game. In the example game image of FIG. 14, a defensive-side rendered region is rendered as the group A's rendered region, and offensive-side rendered regions are rendered as the group B's rendered region and the group C's rendered region. The group A's rendered region is painted in a color corresponding to the group A, which is on a defensive side in the competition game, by a character Ca belonging to the group A, and serves as a defensive-side rendered region painted by the defensive-side character. The group B's rendered region is painted in a color corresponding to the group B, which is on an offensive side in the competition game, by a character Cb belonging to the group B, and serves as an offensive-side rendered region painted by the offensive-side character. The group C's rendered region is painted in a color corresponding to the group C, which is on the same offensive side as that of the group B in the competition game, by a character Cc belonging to the group C, and serves as an offensive-side rendered region painted by the offensive-side character.

In the competition game in which the group A competes with the groups B and C, which cooperate with each other, the number of characters Ca that belong to the group A and participate in the competition game is chosen to be greater than the number of characters Cb that belong to the group B and participate in the competition game and the number of characters Cc that belong to the group C and participate in the competition game. As a result, in the competition game, a balance between the powers or strengths of the defensive side and the offensive side can be achieved. As an example, the number of characters Ca that belong to the group A and participate in the competition game is chosen to be equal to the sum of the number of characters Cb that belong to the group B and participate in the competition game and the number of characters Cc that belong to the group C and participate in the competition game. As a result, a balance between the defensive side and the offensive side can be maintained in the competition game. Specifically, in the present example, the number of characters Ca that belong to the group A and participate in the competition game is chosen to be four, the number of characters Cb that belong to the group B and participate in the competition game is chosen to be two, and the number of characters Cc that belong to the group C and participate in the competition game is chosen to be two.

Even in a competition game performed by three groups, one group is allowed to perform an attack action against another group. For example, if a character Ca belonging to the defensive-side group A has successfully attacked a character Cb belonging to the opposing, offensive-side opponent group B or a character Cc belonging to the opposing, offensive-side opponent group C, the character Cb or Cc suffers damage and the hit points or the like thereof are decreased. In addition, if a character Cb belonging to the offensive-side group B has successfully attacked a character Ca belonging to the opposing, defensive-side opponent group A, the character Ca suffers damage and the hit points or the like thereof are decreased. Furthermore, if a character Cc belonging to the offensive-side group C has successfully attacked a character Ca belonging to the opposing, defensive-side opponent group A, the character Ca suffers damage and the hit points or the like thereof are decreased.

It should be noted that in the present example, when characters belonging to the same group attack each other or characters belonging to the respective cooperating groups attack each other, the hit points or the like of the attacked character may not be decreased and the attack may have no effect, unlike the above attack. As another example, when characters belonging to the same group attack each other or characters belonging to the respective cooperating groups attack each other, the hit points or the like of the attacked character may be decreased, and the attack may have an effect, like the above attack.

In addition, in a competition game performed by three groups, each character may also suffer damage when the character enters the rendered region of another group. For example, when a character Ca belonging to the defensive-side group A enters the offensive-side rendered region of an opposing, offensive-side group (the group B's rendered region and the group C's rendered region), the hit points or the like of the character Ca are decreased based on the duration of entry, the number of times of entry, or the like. In addition, when a character Cb belonging to the offensive-side group B enters the defensive-side rendered region of the opposing, defensive-side group (the group A's rendered region), the hit points or the like of the character Cb are decreased based on the duration of entry, the number of times of entry, or the like. Furthermore, when a character Cc belonging to the offensive-side group C enters the defensive-side rendered region of the opposing, defensive-side group (the group A's rendered region), the hit points or the like of the character Cc are decreased based on the duration of entry, the number of times of entry, or the like.

In addition, in a competition game performed by three groups, each character also performs an action in the competition game more advantageously in a game when the character is present in a region painted by the group to which the character belongs than when the character is not present in the region. It should be noted that in the present example, when a character enters a rendered region of a group that cooperates with the group to which the character belongs, the character may suffer damage, the character may perform an action in the competition game more advantageously than when the character does not enter the rendered region, or the character may be in the same state as that which occurs when the character does not enter the rendered region. If, when a character enters the rendered region of a group that cooperates with the group to which the character belongs, the character suffers damage or the character is in the same state as that which occurs when the character does not enter the rendered region, one character does not have a beneficial effect in the rendered region of another character even though these characters belong to groups that cooperate with each other, and therefore, a novel game environment can be provided.

In addition, in a competition game performed by three groups, each character is also allowed to paint the game stage ST in a color corresponding to the group to which the character belongs, thereby forming the rendered region of the group to which the character belongs. For example, a character Ca belonging to the group A causes a rendering event to occur so that the game stage ST is painted in a color corresponding to the group A, whereby the group A's rendered region (defensive-side rendered region) is rendered. A character Cb belonging to the group B causes a rendering event to occur so that the game stage ST is painted in a color corresponding to the group B, whereby the group B's rendered region (offensive-side rendered region) is rendered. A character Cc belonging to the group C causes a rendering event to occur so that the game stage ST is painted in a color corresponding to the group C, whereby the group C's rendered region (offensive-side rendered region) is rendered. When the rendered region of the group to which a character belongs is extended by the character's rendering event, the contribution parameter and the special action parameter set for the character performing the rendering event are increased based on the extended area. It should be noted that the parameters may be increased for only a character performing the rendering event or all characters belonging to the same group as that of the character performing the rendering event.

It should be noted that a character belonging to a cooperating, offensive-side group is allowed to overpaint the rendered region of a group that cooperates with the offensive-side group with an ink, thereby extending the rendered region of the group to which the character belongs. The contribution parameter and the special action parameter set for a character that has overpainted the rendered region of a cooperating group with an ink may be increased according to the area of the extended rendered region. Thus, a character belonging to one cooperating group alternately overpaints the rendered region of another cooperating group, so that the parameters can be alternately increased, which beneficial effect can be obtained by the characters.

In addition, in a competition game performed by three groups, when the hit points or the like of a character are zero, the character temporarily disappears from the virtual space, and subsequently appears again in an appearance region of the group to which the character belongs. In the present example, as illustrated in FIG. 14, a defensive-side group appearance region EAa in which a character Ca belonging to the defensive-side group A appears again on the game stage ST is provided at or near the center of the game stage ST. Offensive group appearance regions EAb and EAc in which characters Cb and Cc belonging to the two cooperating, offensive-side groups B and C respectively appear again in the game stage ST are set closer to respective end portions of the game stage ST than the defensive-side group appearance region EAa is. In addition, a region in which a character belonging to each group is initially disposed at the beginning of the competition game to appear on the game stage ST is set in the corresponding appearance region. It should be noted that each appearance region may have any size, or may be a point.

As another example, as illustrated in FIG. 15, after a character temporarily disappears from the virtual space, the character may appear again on the game stage ST by moving to a return point RP that is set in association with the character and is present in the air in the virtual space, and then moving toward any point in an appearance region EA on the game stage ST that is set in association with the group of the character. It should be noted that in the above example, the appearance region EA may be relatively large. As an example, as illustrated in FIG. 15, the defensive-side group appearance region EAa may occupy most of a center portion other than left and right regions of the game stage ST, and the offensive-side group appearance regions EAb and EAc may occupy most of left and right portions, respectively, of the game stage ST other than the defensive-side group appearance region EAa. In addition, a return point RP may be in airspace above a corresponding appearance region EA (i.e., a return point RPa of the group A is in airspace above the appearance region EAa of the group A, a return point RPb of the group B is in airspace above the appearance region EAb of the group B, and a return point RPc of the group C is in airspace above the appearance region EAc of the group C), or may be on the game stage ST, but not in airspace above the corresponding appearance region EA, or may be in airspace above a location outside the game stage ST as illustrated in FIG. 15. In addition, the location of a virtual camera (point of view) that is set when a character appears again, may be chosen to follow the movement of the character so that the character is included in the range of view.

In the examples of FIGS. 14 and 15, the offensive-side group appearance region EAb of a character Cb belonging to the offensive-side group B is set at a left end portion of the game stage ST, and the offensive-side group appearance region EAc of a character Cc belonging to the offensive-side group C is set at a right end portion of the game stage ST. Thus, the defensive-side group appearance region EAa is interposed between the offensive-side group appearance region EAb and the offensive-side group appearance region EAc on the game stage ST. Therefore, a region in which a character belonging to a defensive-side group (a character Ca belonging to the group A) appears is set and interposed between regions in which characters belonging to opposing, offensive-side groups (characters Cb and Cc belonging to the groups B and C) appear.

In addition, a period of time until a character belonging to an offensive-side group (characters Cb and Cc belonging to the groups B and C) appears again on the game stage ST after their temporary disappearance from the virtual space may be chosen to be shorter than a period of time until a character belonging to an opposing, defensive-side group (a character Ca belonging to the group A) appears again on the game stage ST after their temporary disappearance from the virtual space. Thus, a character belonging to a defensive-side group competes in the competition game under a disadvantageous condition compared to a character belonging to a cooperating, offensive-side group.

In a competition game performed by three groups of the present example, a virtual object dedicated for an offensive-side group may be disposed on the game stage ST. The virtual object may have a function of painting a region on the game stage ST around the virtual object in a color corresponding to a group acquiring the virtual object.

For example, as illustrated in FIG. 16, a first object OBJ1 is disposed at or near the center of the game stage ST. A character belonging to an offensive-side group performs a predetermined acquisition action (trying action) on the first object OBJ1. When the predetermined acquisition action is successful, the group to which the character belongs is given a right to acquire the virtual object. Thereafter, as illustrated in FIG. 17, a second object OBJ2 corresponding to the acquired first object OBJ1 appears and is installed as the virtual object at a predetermined appearance location on the game stage ST. It should be noted that in the present example, the second object OBJ2 acquired by the group to which the character performing the acquisition action belongs appears and is installed as the virtual object at a predetermined appearance location on the game stage ST instead of the first object OBJ1. The first object OBJ1 and the second object OBJ2 may be the same object. The second object OBJ2 may be acquired and appear with the acquired first object OBJ1 remaining on the game stage ST.

The second object OBJ2 is installed at a predetermined location on the game stage ST. The second object OBJ2 serves as a machine that automatically continues to paint the game stage ST around the installation location in a color corresponding to the group acquiring the second object OBJ2. For example, as illustrated in FIGS. 16 and 17, when a character Cc belonging to the group C acquires the first object OBJ1, the second object OBJ2, which corresponds to the first object OBJ1, is acquired by the group C and is installed at a predetermined location on the game stage ST, and automatically continues to paint the game stage ST around the installation location in a color corresponding to the group C until the end of the competition game. As a result, the group acquiring the first object OBJ1 has an advantage in the competition game.

It should be noted that the first object OBJ1 can be acquired by characters belonging to cooperating, offensive-side groups (e.g., the groups B and C), and cannot be acquired by characters belonging to a defensive-side group (e.g., the group A). Therefore, no defensive-side group is allowed to acquire the second object OBJ2.

In addition, the first object OBJ1 may appear only a predetermined number of times (e.g., twice) in the competition game. For example, the first object OBJ1 may appear for the first time after a predetermined period of time (e.g., 20 seconds) has passed since the start of the competition game, and finally appear after a predetermined period of time (e.g., 5 seconds) has passed since the acquisition of the first object OBJ1 appearing for the first time. As a result, the number of times the second object OBJ2 appears on the game stage ST is limited to a predetermined number of times the first object OBJ1 appears (e.g., two times).

As described above, a location where the first object OBJ1 appears is at or near the center of the game stage ST, e.g., an appearance location EP1 illustrated in FIG. 14. In the case in which the first object OBJ1 appears a plurality of times, the first object OBJ1 appears at the same appearance location EP1 at or near the center of the game stage ST. On the other hand, a location where the second object OBJ2 appears may vary depending on a group that acquires the second object OBJ2. For example, when one of offensive-side groups that cooperate with each other acquires a first, second object OBJ2, the first, second object OBJ2 appears at an appearance location in an appearance region of the group acquiring the object on the game stage ST. Thereafter, when the same one of the offensive-side groups acquires a second, second object OBJ2, the second, second object OBJ2 appears at an appearance location at or near the center of the game stage ST. It should be noted that the area of a rendered region painted in a corresponding color by the second object OBJ2 may vary depending on the location where the second object OBJ2 is installed.

As an example, when the offensive-side group B acquires a first, second object OBJ2, the first, second object OBJ2 for the group B appears at an appearance location EP2-1*b* (e.g., at or near the center of a left region of the game stage ST) of the group B as illustrated in FIG. 14. Thereafter, when the offensive-side group B acquires a second, second object OBJ2, the second, second object OBJ2 for the group B appears a center appearance location EP2-2 (e.g., at or near the center of the game stage ST) as illustrated in FIG. 14. On the other hand, when the offensive-side group C acquires a first, second object OBJ2, the first, second object OBJ2 for the group C appears at an appearance location EP2-1*c* (e.g., at or near the center of a right region of the game stage ST) of the group C as illustrated in FIG. 14. Thereafter, when the offensive-side group C acquires a second, second object OBJ2, the second, second object OBJ2 for the group C appears a center appearance location EP2-2 as illustrated in FIG. 14.

In addition, the acquisition action that is performed by a character in order to acquire the first object OBJ1 may require a predetermined period of time. As an example, in the acquisition action, when a character's action of remaining in a predetermined range with reference to the first object OBJ1 disposed on the game stage ST has continued for a predetermined acquisition completion time, the first object OBJ1 may be acquired by the character.

The acquisition completion time may vary depending on a character's action. For example, if a character's action of remaining in a predetermined range with reference to the first object OBJ1 has not continued for the acquisition completion time set at that time, i.e., a time count for which a character's action of remaining in a predetermined range with reference to the first object OBJ1 has continued before the character ends remaining in the predetermined region is less than the acquisition completion time set at that time, the time count is temporarily reset. When the time count is reset, the acquisition completion time that is used in time counting for the next acquisition action may be reduced compared to the acquisition completion time used in the previous time counting. It should be noted that the reduction of the acquisition completion time may be performed for only acquisition actions performed by characters belonging to the same group, or for acquisition actions performed by any characters belonging to offensive-side groups that cooperate with each other.

In addition, a parameter corresponding to a character belonging to a group acquiring the second object OBJ2 may be increased based on a rendered region that has been painted in a corresponding color by the second object OBJ2 to extend. For example, the contribution parameters and the special action parameters set for all characters belonging to a group acquiring the second object OBJ2 may be increased based on the area of a rendered region that has been painted in a corresponding color by the second object OBJ2 to extend, or the acquisition itself of the second object OBJ2.

In determination of a result of a competition game performed by three groups in the present example, cooperation between two offensive-side groups may be embodied by the two groups sharing a winning condition. For example, if a first condition that is a condition under which a defensive-side group wins is satisfied, the defensive-side group is determined to be a winner in the competition game. If a second condition that is a winning condition shared by two groups constituting an offensive-side group is satisfied, the two groups constituting an offensive-side group may be determined to be a winner in the competition game.

As a first example of a winning condition serving as the first and second conditions, a side that has a larger rendered region area after a predetermined period of time has passed since the start of a competition game may be a winner. Specifically, if the area of a rendered region painted in a color corresponding to a defensive-side group is larger than the sum of the areas of rendered regions painted in colors corresponding to two groups of an offensive-side group, the first condition is satisfied, so that the defensive-side group is a winner. On the other hand, if the sum of the areas of rendered regions painted in colors corresponding to two groups of an offensive-side group is larger than the area of a rendered region painted in a color corresponding to a defensive-side group, the second condition is satisfied, so that the two groups constituting an offensive-side group are a winner.

It should be noted that in the first example, the area sum may not be used. For example, if the area of a rendered region painted in a color corresponding to a defensive-side group is larger than both of the areas of rendered regions painted in respective colors corresponding to two groups of an offensive-side group, the first condition may be satisfied, so that the defensive-side group may be a winner. On the other hand, if at least one of the areas of rendered regions painted in respective colors corresponding to two groups of an offensive-side group is larger than the area of a rendered region painted in a color corresponding to a defensive-side group, the second condition may be satisfied, so that the two groups constituting an offensive-side group may be a winner.

As a second example of a winning condition serving as the first and second conditions, the side to which a group belongs may be a winner if a predetermined target region on the game stage ST has continued to be a rendered region for the group for at least a predetermined period of time. Specifically, if the target region has continued to be a rendered region painted in a color corresponding to a defensive-side group for at least a predetermined period of time, the first condition is satisfied, so that the defensive-side group is a winner. On the other hand, if the target region has continued to be any one of rendered regions painted in respective colors corresponding to two groups of an offensive-side group for at least a predetermined period of time, the second condition is satisfied, so that the two groups constituting an offensive-side group are a winner.

As a third example of a winning condition serving as the first and second conditions, if a vehicular object capable of carrying a character has reached a goal on a competition opponent's side, the side to which the vehicular object belongs may be a winner. Specifically, if a vehicular object that moves between a goal of a defensive-side group and a goal of an offensive-side group and toward a goal of a competition opponent's-side group against the group to which a character carried on the vehicular object belongs has reached the goal of the offensive-side group, the first condition is satisfied, so that the defensive-side group is a winner. On the other hand, if the vehicular object has reached a goal of the defensive-side group, the second condition is satisfied, so that two groups constituting an offensive-side group are a winner.

As a fourth example of a winning condition serving as the first and second conditions, if a portable object capable of being carried by a character has been brought to a goal of a competition opponent's side, the side carrying the portable object may be a winner. Specifically, if a character belonging to a defensive-side group has reached a goal of an offensive-side group, carrying a portable object disposed on the game stage ST, the first condition is satisfied, so that the defensive-side group is a winner. On the other hand, if a character belonging to any one of two groups constituting an offensive-side group has reached a goal of a defensive-side group, carrying the portable object, the second condition is satisfied, so that the two groups constituting an offensive-side group are a winner.

As a fifth example of a winning condition serving as the first and second conditions, a side that has brought a larger number of collectable objects into a goal of a competition opponent's side may be a winner. Specifically, if the number of collectable objects scattered on the game stage ST that have been picked up and put into an offensive-side group by a character belonging to a defensive-side group is greater than the number of collectable objects put into a goal of the defensive-side group by a character belonging to each of two offensive-side groups, the first condition is satisfied, so that the defensive-side group is a winner. On the other hand, if the number of collectable objects that have been picked up and put into a goal of a defensive-side group by characters belonging to two groups constituting an offensive-side group is greater than the number of collectable objects that have been put into a goal of the offensive-side group by a character belonging to the defensive-side group, the second condition is satisfied, so that the two groups constituting the offensive-side group are a winner.

Next, an example flow of the competition game until final rankings of groups are calculated will be described with reference to FIG. 18. The game flow in the present example is roughly divided into a "vote period", a "first period", a "second period", and an "aggregation period". Schedule management for starting and ending these periods, management of characters constituting groups, management of matching-up between groups, management of groups' achievements, wins/losses, etc., and the like may be performed by another information processing apparatus that can communicate with each game system 1 (e.g., a server that can communicate through a network, hereinafter simply referred to as a server).

The "vote period" is a first period of time in the above game flow during which a plurality of group candidates are set by the server assigning a character operated by each user to one of three group candidates according to voting based on the user's operation input. For example, during the "vote period", the server presents three options for assigning a character operated by each user to one of three group candidates, and each user votes to choose one of the options, so that the server decides to which group candidate a character operated by the user is to be assigned. For example, the three group candidates include a candidate for the group A that is to participate as the group A in the competition game, a candidate for the group B that is to participate as the group B in the competition game, and a candidate for the group C that is to participate as the group C in the competition game. When a user votes to choose an option A from the three options, a player character PC operated by the voting user is assigned to a candidate for the group A. When a user votes to choose an option B from the three options, a player character PC operated by the voting user is assigned to a candidate for the group B. When a user votes to choose an option C from the three options, a player character PC operated by the voting user is assigned to a candidate for the group C. It should be noted that the "vote period" is a period of time during which the results of votes performed by users from the respective game systems 1 are aggregated by the server, and that ends after a predetermined period of time has passed.

The "first period" follows the "vote period" in the game flow. During the "first period", a competition game is performed between two groups by the server performing matching-up management based on users' requests for a competition. For example, during the "first period", requests for a competition from characters belonging to group candidates based on users' operation inputs are aggregated, and two groups satisfying a matching-up condition are matched up for a competition. Specifically, the server classifies the requests for a competition according to group candidate, and randomly determines two group candidates for a competition based on the number of requests for a competition, achievements in competitions, and the like. Thereafter, the server chooses a predetermined number (e.g., four) of characters which are to compete, as a member of a group which is to perform a competition game (the group A), from one (e.g., a candidate for the group A) of two group candidates which are to compete. In addition, the server chooses a predetermined number (e.g., four) of characters for which there is a request for a competition, as a member of a group which is to perform a competition game (the group B), from the other (e.g., a candidate for the group B) of the two group candidates which are to compete. Thereafter, the server outputs the chosen members of the two groups as a matching-up result (i.e., the result of matching up a side including four characters with a side including another four characters) to game systems 1, whereby a competition game based on the matching-up result, i.e., a competition game between the two matched-up groups, is started.

It should be noted that during the "first period", members of two groups may be chosen from the same group candidate to be matched up in a competition game. For example, if there is no request for a competition from other group candidates to be matched up, or the number of requests for a competition is insufficient, so that a matching-up condition is not satisfied between different group candidates, the server chooses, from the same group candidate for which there is a request for a competition, a predetermined number of (e.g., four) characters as a member of one group in a competition game, and a predetermined number of (e.g., four) characters as a member of the other group in the competition game. Thereafter, the server may output the chosen members of the two groups as a matching-up result (i.e., the result of matching up a side including four characters and a side including another four characters chosen from the same group candidate) to game systems 1.

During the "first period", the server appropriately performs the matching-up according to the requests for a competition, and obtains and aggregates the results of competitions prepared by the matching-up from game systems 1. Thereafter, the server ends the "first period" after a predetermined period of time has passed, and calculates rankings of the group candidates based on the results of competitions and the like during the "first period".

The "second period" follows the "first period" in the game flow. During the "second period", a competition game between three groups is allowed based on matching-up management by the server. For example, the server assigns each of three group candidates to a defensive side or an offensive side in a competition game between three groups based on the rankings of the group candidates calculated during the "first period". Specifically, the server causes a character chosen from a group candidate that is first in the rankings calculated during the "first period" (e.g., a candidate for the group A) to belong to a defensive-side group (e.g., the group A) in a competition game between three groups. In addition, the server causes a character chosen from a group candidate that is second in the rankings calculated during the "first period" (e.g., a candidate for the group B) to belong to one (e.g., the group B) of two offensive-side groups in the competition game between three groups. In addition, the server causes a character chosen from a group candidate that is third in the rankings calculated during the "first period" (e.g., a candidate for the group C) to belong to the other (e.g., the group C) of the two offensive-side groups in the competition game between three groups.

When a user who operates a character of an offensive-side group candidate (e.g., candidates for the groups B and C) in a competition game between three groups outputs a request for a competition between three groups, the server matches up the three groups in the competition. For example, the server, when receiving a request for a competition between the three groups, chooses a predetermined number of (e.g., two) characters for which there is a request for a competition from one (e.g., a candidate for the group B) of two offensive-side group candidates, and a predetermined number of (e.g., two) characters for which there is a request for a competition from the other (e.g., a candidate for the group C) of the same two offensive-side group candidates, as members of offensive-side groups that cooperate with each other (the groups B and C) in the competition game. In addition, the server chooses a predetermined number of (e.g., four) characters from a defensive-side group candidate (e.g., a candidate for the group A) as members of a defensive-side group (the group A) that opposes the offensive-side groups in the competition game. It should be noted that a character chosen as a member of a defensive-side group from defensive-side group candidates may be one for which there is a request for a competition between three groups or one for which there is not a request for a competition between three groups. Thereafter, the server outputs the result of matching up three groups, i.e., chosen members of three groups (i.e., the result of matching up a side including four characters with a side including two characters+two characters) to game systems 1, thereby causing the game systems 1 to start a competition game based on the matching-up result, i.e., a competition game between the matched-up three groups.

It should be noted that during the "second period", two groups may also be matched up in a competition game as described above. The server may aggregate requests for a competition between two groups, and match up two groups in a competition game as in the "first period" (i.e., matching-up of a side including four characters with a side including another four characters). It should be noted that even when a use who operates a character belonging to a group candidate that is first in the rankings during the "first period", i.e., a group candidate that may be a defensive-side group in a competition between three groups, has not output a request for a competition between three groups, then if there is another group candidate's request for a competition between three groups, matching-up of three groups in a competition may be forcibly performed. It is considered that a user who operates a character of a group candidate having a higher ranking may avoid a competition between three groups in order to maintain the current ranking. However, such a user is forcibly matched up in a competition between three groups by a request for a competition output by a group candidate having a lower ranking, so that matching-up of three groups in a competition can be easily achieved. In addition, if the number of group-constituting characters (e.g., four characters) in a competition game between two groups is the same as the number of characters (e.g., four characters) constituting a defensive-side group in a competition game between three groups, then when the same number of constituent characters output a request for a competition between two groups, the competition can be forcibly transferred to a competition between three groups without changing the number of constituent characters.

In addition, in the foregoing description, a character chosen from a group candidate that is first in the rankings calculated during the "first period" belongs to a defensive-side group, and characters chosen from group candidates that are second and third in the rankings belong to an offensive-side group, whereby matching-up of three groups in a competition game is achieved. Alternatively, the matching-up may be performed in other fashions. As an example, a character chosen from a group candidate that is first in the rankings calculated during the "first period" may belong to a defensive-side group, and characters chosen from a group candidate that is second in the rankings may each belong to a corresponding one of two offensive-side groups, whereby matching-up of three groups in a competition game may be achieved. As another example, a character chosen from a group candidate that is first in the rankings calculated during the "first period" may belong to a defensive-side group, and characters chosen from a group candidate that is third in the rankings may each belong to a corresponding one of two offensive-side groups, whereby matching-up of three groups in a competition game may be achieved. In those cases, characters that are to belong to two offensive-side groups are chosen from the same group candidate. However, by setting different colors for the two groups, a similar competition game can be performed.

During the "second period", the server appropriately performs the matching-up according to the request for a competition, and obtains the result of a competition set by the matching-up from each game system 1. Thereafter, the server ends the "second period" after a predetermined period of time has passed, and then starts the "aggregation period" in the game flow.

During the "aggregation period", the server obtains and aggregates the results of competitions set by the matching-up during the "first period" and the "second period" from the game systems 1. Thereafter, the server calculates the final ranking of each group candidate based on the results of votes during the "vote period", the aggregated competition results, and the like. As an example, the server gives more points to a group candidate having a higher share of the vote based on the results of votes during the "vote period". In addition, the server gives more points to a group candidate having a higher winning rate based on the competition results. Thereafter, the server determines rankings of group candidates in descending order of the number of obtained points, i.e., with the highest first. In addition, in the determination of rankings, the server may take into account the contribution parameter obtained by the user of each group candidate from the competition results. It should be noted that the server may give a reward to each user belonging to a group candidate based on the final ranking of the group candidate. In addition, the server may further give a reward to a user who operates a character, based on the contribution parameter of the character obtained in the game.

Figure 19:
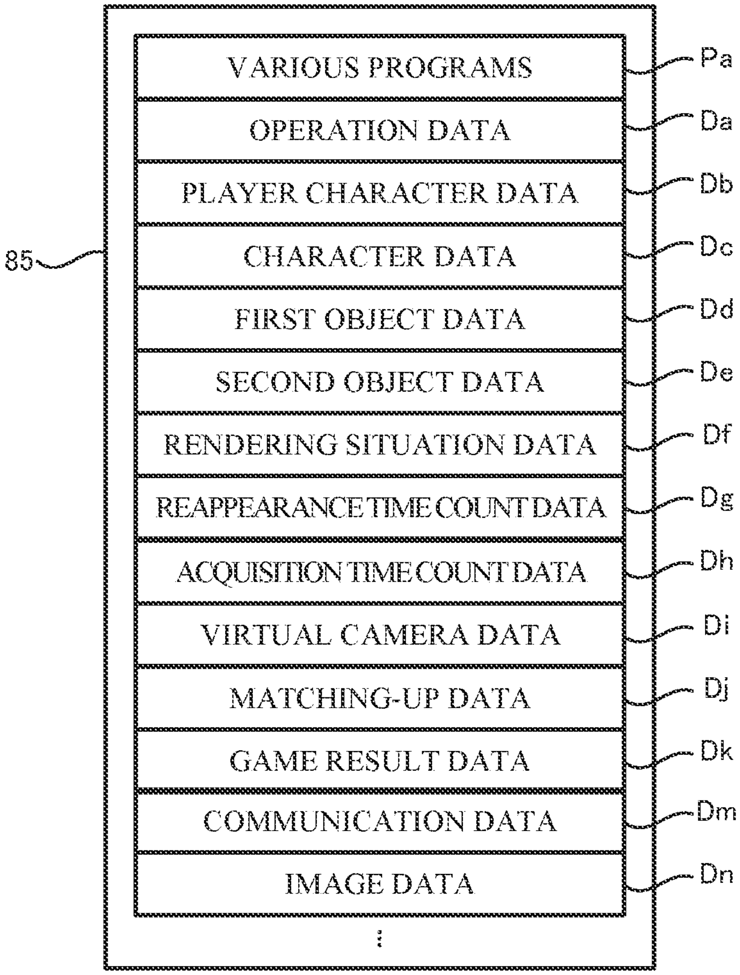
FIG. 19 is a diagram illustrating a non-limiting example of a data area set in a DRAM 85 of a main body apparatus 2 in the present example.

Next, an example of a specific process that is executed in the game system 1 in the present example will be described with reference to FIGS. 19 to 21. FIG. 19 is a diagram illustrating an example of a data area set in the DRAM 85 of the main body apparatus 2 in the present example. It should be noted that the DRAM 85 also stores data used in other processes in addition to the data of FIG. 19, and those data will not be described in detail.

Various programs Pa that are executed in the game system 1 are stored in a program storage area of the DRAM 85. In the present example, the programs Pa include a communication program for communicating other game systems and a server, an application program for performing information processing (e.g., a game process) based on data obtained from the left controller 3 and/or the right controller 4, and the like. Note that the programs Pa may be previously stored in the flash memory 84, may be obtained from a storage medium removably attached to the game system 1 (e.g., a storage medium attached to the slot 23) and then stored in the DRAM 85, or may be obtained from another apparatus via a network, such as the Internet, and then stored in the DRAM 85. The processor 81 executes the programs Pa stored in the DRAM 85.

Various kinds of data that are used in processes such as a communication process and an information process that are executed in the game system 1 are stored in a data storage area of the DRAM 85. In the present example, the DRAM 85 stores operation data Da, player character data Db, character data Dc, first object data Dd, second object data De, rendering situation data Df, reappearance time count data Dg, acquisition time count data Dh, virtual camera data Di, matching-up data Dj, game result data Dk, communication data Dm, image data Dn, and the like.

The operation data Da is obtained, as appropriate, from each of the main body apparatus 2 and the left controller 3 and/or the right controller 4. As described above, the operation data obtained from each of the main body apparatus 2 and the left controller 3 and/or the right controller 4 includes information about an input from each input section (specifically, each button, an analog stick, or each sensor) (specifically, information about an operation or the result of detection by a sensor). In the present example, operation data is obtained from each of the main body apparatus 2 and the left controller 3 and/or the right controller 4 at predetermined intervals. The obtained operation data is used to update the operation data Da as appropriate. It should be noted that the operation data Da may be updated for each frame that is the cycle of a process executed in the game system 1, or may be updated each time operation data is obtained.

The player character data Db indicates the place, direction, position, state, group, corresponding color, various parameters, and the like of the player character PC disposed in the virtual space and operated by the user of the game system 1.

The character data Dc indicates the place, direction, position, state, group, corresponding color, various parameters, and the like of a character(s) disposed in the virtual space and operated by the user of another game system(s) 1.

The first object data Dd indicates the place, direction, position, state, and the like of a first object OBJ1 in the virtual space. The second object data De indicates the place, direction, position, state, acquisition group, and the like of a second object OBJ2 in the virtual space.

The rendering situation data Df indicates the locations and areas of a rendered region of each group and a "neutral region" in the virtual space.

The reappearance time count data Dg indicates a time count until a character appears again in the virtual space. The acquisition time count data Dh indicates a time count during which the operation of acquiring a first object OBJ1 is continued.

The virtual camera data Di indicates the location, orientation, and the like of a virtual camera set in the virtual space.

The matching-up data Dj indicates details of matching-up performed by a server.

The game result data Dk indicates a result of a competition game performed in the game system 1.

The communication data Dm includes data that has been received from other game systems 1 or a server through wireless communication, and data that is to be transmitted to other game systems 1 or a server through wireless communication. The data includes operation data of other users' operations performed using other game systems 1, data relating to the locations, actions, and the like of characters controlled by other game systems 1, data indicating a process result of a server, operation data of the game system 1, data relating to the location, action, and the like of the player character PC, data requested by a server, data that a server is requested to send, and the like.

The image data Dn is used to display, on the display 12 of the main body apparatus 2, images (e.g., an image of the player character PC, images of other characters, images of virtual objects, an image of a game stage, images of rendered regions, and a background image) in a competition game.

Next, a detailed example of a game process of the present example will be described with reference to FIGS. 20 and 21. FIG. 20 is a flowchart illustrating an example of a game process that is executed in a game system 1. FIG. 21 is a subroutine illustrating an example of details of an object action control process that is executed in step S124 of FIG. 20. In the present example, a series of steps illustrated in FIGS. 20 and 21 are executed by the processor 81 executing a communication program and a predetermined application program (game program) included the programs Pa. The game processes of FIGS. 20 and 21 are started with any appropriate timing.

Figure 20:
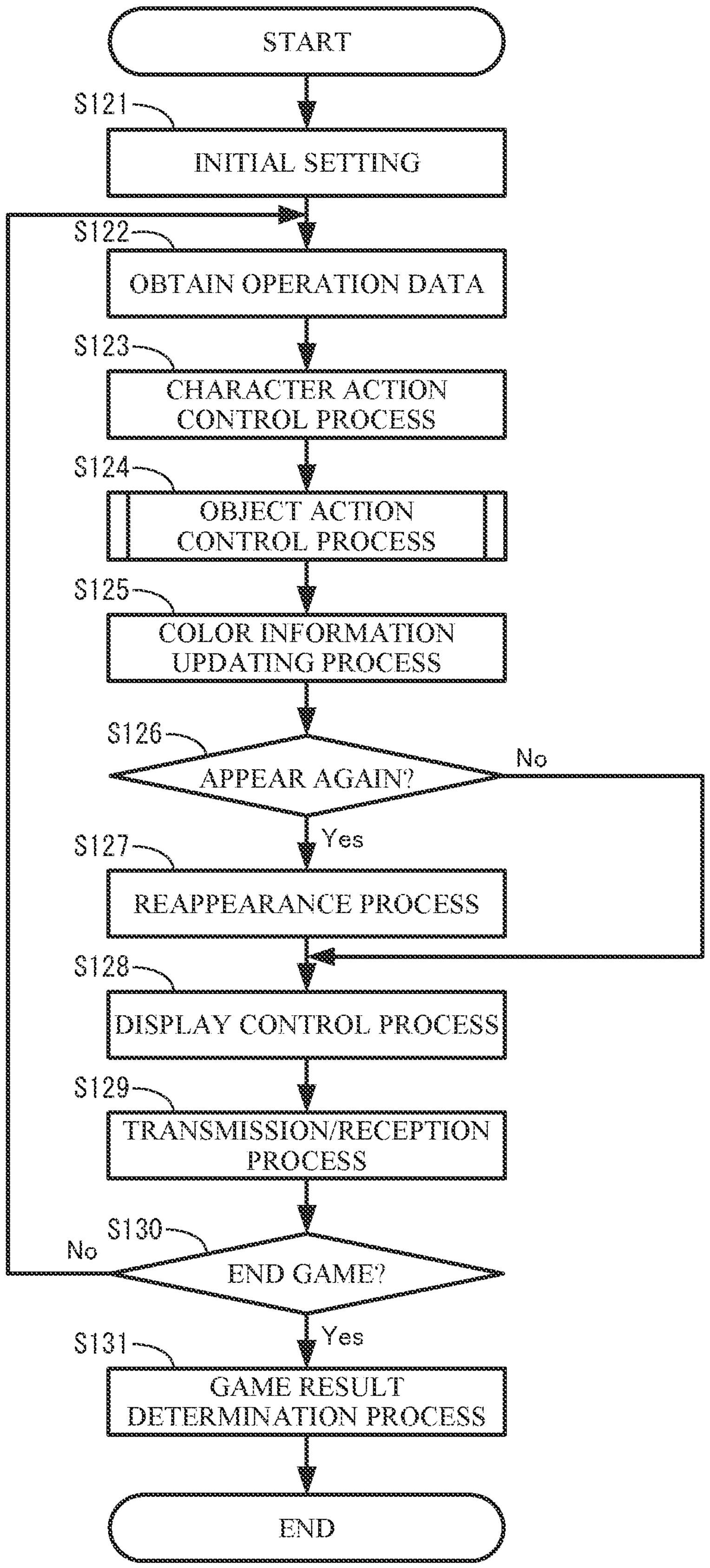
FIG. 20 is a flowchart illustrating a non-limiting example of a game process that is executed in a game system 1.
Figure 21:
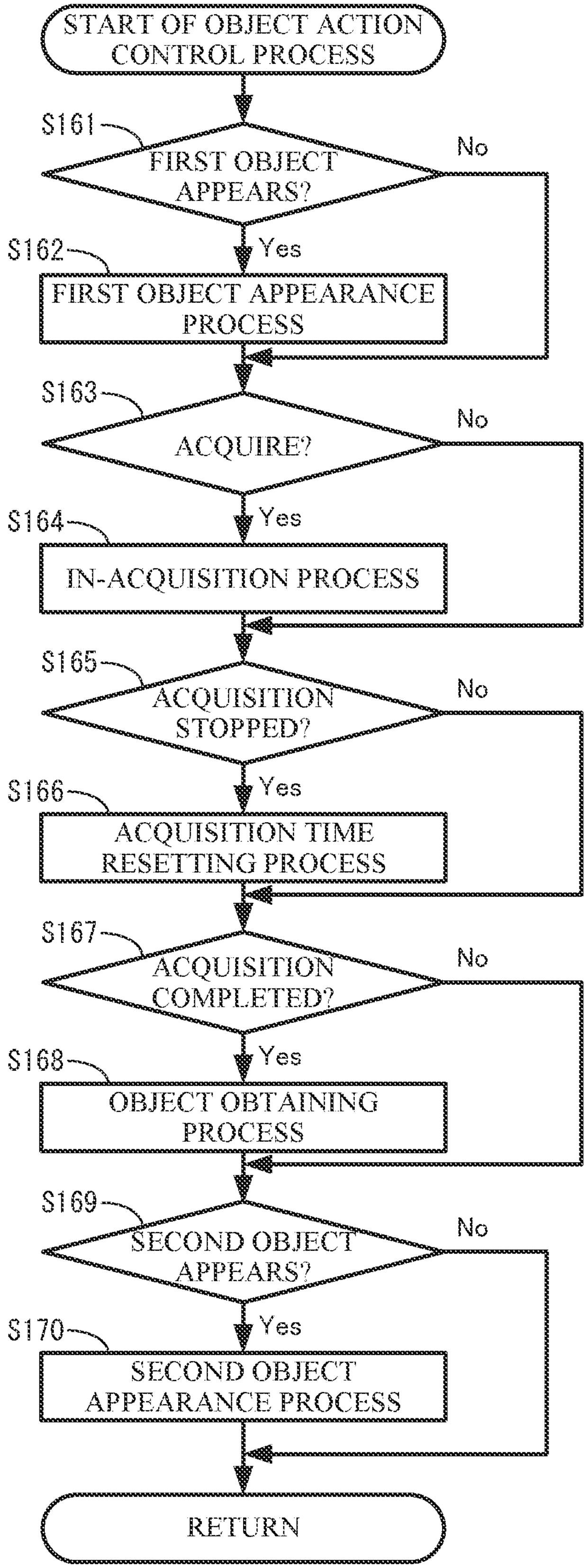
FIG. 21 is a subroutine illustrating a non-limiting example of details of an object action control process that is executed in step S124 of FIG. 20.

It should be noted that the steps in the flowcharts of FIGS. 20 and 21, which are merely illustrative, may be executed in a different order, or another step may be executed in addition to (or instead of) each step, if a similar effect is obtained. In the present example, it is assumed that the processor 81 executes each step of the flowcharts. Alternatively, a portion of the steps of the flowcharts may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 20 and 21 may be executed by a plurality of information processing apparatuses including the main body apparatus 2 cooperating with each other.

In FIG. 20, the processor 81 performs initial setting for the game process (step S121), and proceeds to the next step. For example, in the initial setting, the processor 81 initializes parameters for performing steps described below, and updates each data. As an example, the processor 81 receives information about matching-up for a competition game from a server, and updates the matching-up data Dj. In addition, the processor 81 executes processes of transmitting data for starting the competition game to game systems 1 operated by other users participating in the competition game, and receiving data for starting the competition game from the game systems 1 operated by those other users, and updates the communication data Dm with the received data. In addition, the processor 81 generates a virtual space in an initial state by arranging characters and the like on a game stage in the virtual space, sets groups to which characters participating in the competition game belong, and updates the player character data Db and the character data Dc. In addition, the processor 81 arranges a virtual camera in a predetermined orientation at a default location in the virtual space in the initial state, and updates the virtual camera data Di.

Next, the processor 81 obtains operation data from the main body apparatus 2 and the left controller 3 and/or the right controller 4, updates the operation data Da (step S122), and proceeds to the next.

Next, the processor 81 executes a character action control process (step S123), and proceeds to the next step. For example, the processor 81 sets an instruction to the player character PC, based on the operation data Da, causes the player character PC to perform an action according to the instruction, and updates the player character data Db. In addition, the processor 81 causes characters operated by other users to perform respective actions based on the communication data Dm, and updates the character data Dc. It should be noted that when the player character PC and characters perform an action that changes a contribution parameter or a special action parameter, the processor 81 changes the parameter based on the action, and updates the player character data Db and the character data Dc with the changed parameter. In addition, when there is any character that has disappeared from the virtual space due to another character's attack or the like, the processor 81 sets the player character data Db or the character data Dc such that the data indicates the disappearance of the character from the virtual space, adds a predetermined period of time (e.g., a 1-frame time) to a reappearance time indicated by the reappearance time count data Dg, and updates the reappearance time count data Dg with the added reappearance time.

Next, the processor 81 executes an object action control process (step S124), and proceeds to step S125. The object action control process executed in step S124 will be described below with reference to FIG. 21.

In FIG. 21, the processor 81 determines whether or not it is time to cause a first object OBJ1 to appear in the virtual space (step S161). For example, if it is time to cause a first object OBJ1 to appear in the virtual space or if it is during a scene in which a first object OBJ1 is caused to appear in the virtual space, the result of the determination by the processor 81 in step S161 is positive. If it is time to cause a first object OBJ1 to appear in the virtual space, the processor 81 proceeds to step S162. Otherwise, i.e., if it is not time to cause a first object OBJ1 to appear in the virtual space, the processor 81 proceeds to step S163.

In step S162, the processor 81 executes a first object appearance process, and proceeds to step S163. For example, the processor 81 causes a first object OBJ1 at an appearance location (e.g., the appearance location EP1 of FIG. 14) on a game stage, and updates the first object data Dd. For example, the first object appearance process of step S162 controls a first object OBJ1 such that the first object OBJ1 approaches an appearance location on a game stage from airspace in the virtual space, and thereafter, the first object OBJ1 is placed at the appearance location. Therefore, in step S162, the processor 81 executes the first object appearance process for a predetermined period of time (e.g., a 1-frame time) and then ends the process. By repeatedly performing such a process loop, the above action by the first object appearance process proceeds.

In step S163, the processor 81 determines whether or not there is any character that is performing an action of acquiring the first object OBJ1. For example, in the present example, if a character belonging to an offensive-side group is performing an action of remaining in a predetermined range with reference to the first object OBJ1 placed on the game stage, the processor 81 determines that there is a character that is performing an action of acquiring the first object OBJ1. If there is a character that is performing an action of acquiring the first object OBJ1, the processor 81 proceeds to step S164. Otherwise, i.e., if there is not any character that is performing an action of acquiring the first object OBJ1, the processor 81 proceeds to step S165.

In step S164, the processor 81 executes an in-acquisition process, and proceeds to step S165. For example, the processor 81 executes the in-acquisition process by adding a predetermined period of time (e.g., a 1-frame time) to an acquisition time indicated by the acquisition time count data Dh, and updating the acquisition time count data Dh with the resultant acquisition time.

In step S165, the processor 81 determines whether or not the character that had been performing an action of acquiring the first object OBJ1 has stopped the action. If the character has stopped the acquisition action, the processor 81 proceeds to step S166. Otherwise, i.e., if the character is still performing an action of acquiring the first object OBJ1 or if the acquisition time is not being counted down, the processor 81 proceeds to step S167.

In step S166, the processor 81 executes an acquisition time resetting process, and proceeds to step S167. For example, the processor 81 executes the acquisition time resetting process by resetting and updating the acquisition time indicated by the acquisition time count data Dh, and reducing the acquisition completion time set for determining the completion of acquisition by a predetermined period of time.

In step S167, the processor 81 determines whether or not the acquisition of the first object OBJ1 has been completed. For example, if the acquisition time indicated by the acquisition time count data Dh has reached the acquisition completion time set at the current time, the result of the determination by the processor 81 in step S167 is positive. If the acquisition of the first object OBJ1 has been completed, the processor 81 proceeds to step S168. Otherwise, i.e., if the acquisition of the first object OBJ1 has not been completed, the processor 81 proceeds to step S169.

In step S168, the processor 81 executes an object acquisition process, and proceeds to step S169. For example, the processor 81 removes the first object OBJ1 from the virtual space, sets a state in which the group to which a character which has completed the acquisition action belongs acquires a second object OBJ2 corresponding to the first object OBJ1, and updates the first object data Dd and the second object data De. In addition, the processor 81 sets the acquisition completion time, and resets the acquisition time count data Dh.

In step S169, the processor 81 determines whether or not it is time to cause the second object OBJ2 to appear in the virtual space. For example, if it is immediately after step S168 has been executed or if it is during a scene in which the second object OBJ2 is caused to appear in the virtual space, the result of the determination by the processor 81 in step S169 is positive. If it is time to cause the second object OBJ2 to appear in the virtual space, the processor 81 proceeds to step S170. Otherwise, i.e., if it is not time to cause the second object OBJ2 to appear in the virtual space, the processor 81 ends the subroutine.

In step S170, the processor 81 executes a second object appearance process, and ends the subroutine. For example, the processor 81 causes a second object(s) OBJ2 at an appearance location (e.g., the appearance location EP2-1*b*, EP2-1*c*, or EP2-2 in FIG. 14) on the game stage, depending on the group that acquires the second object OBJ2 and the number of second objects OBJ2 acquired by the group, and updates the second object data De. For example, in the second object appearance process of step S170, the second object OBJ2 is controlled such that the second object OBJ2 approaches an appearance location on the game stage from airspace in the virtual space, and thereafter, the second object OBJ2 is installed at the appearance location. Therefore, in step S170, the processor 81 executes the second object appearance process for a predetermined period of time (e.g., a 1-frame time) and then ends the process. By repeatedly performing such a process loop, the above action by the second object appearance process proceeds.

Referring back to FIG. 20, after the object action control process of step S124, the processor 81 executes a color information updating process (step S125), and proceeds to the next step. For example, if there is a character that is performing an action of applying an ink, based on the player character data Db and the character data Dc, the processor 81 enlarges a rendered region on the game stage that is painted in a color corresponding to the group to which the character belongs, reduces another group's rendered region or a "neutral region", depending on the enlargement, and updates the rendering situation data Df. In addition, based on the second object data De, the processor 81 enlarges a rendered region on the game stage that is located around the second object OBJ2 that has already been arranged on the game stage, by painting the rendered region in a color corresponding to the group that has acquired the second object OBJ2, reduces another group's rendered region or a "neutral region", depending on the enlargement, and updates the rendering situation data Df. As an example, the processor 81 executes the color information updating process by executing a process of updating color information of coordinate points to be painted in a corresponding color, in "paint effect texture" corresponding to a surface of the game stage, calculates the area of the rendered region of each group after the enlargement or reduction of the rendered region, and updates the rendering situation data Df. In addition, the processor 81 changes the player character PC's and characters' contribution parameters and special action parameters, which increase, depending on the enlargement of the rendered region, and updates the player character data Db and the character data Dc with the changed parameters.

Next, the processor 81 determines whether or not to cause a character to appear again in the virtual space (step S126). For example, if the reappearance time indicated by the reappearance time count data Dg has reached a reappearance threshold of the group to which a character to be caused to appear again belongs or if it is during a scene in which a character is caused to appear again in the virtual space, the result of the determination by the processor 81 in step S126 is positive. If the processor 81 determines to cause a character to appear again in the virtual space, the processor 81 proceeds to step S127. Otherwise, i.e., the processor 81 determines not to cause a character to appear again in the virtual space, the processor 81 proceeds to step S128.

In step S127, the processor 81 executes a process of causing a character to appear again in the virtual space, and proceeds to step S128. For example, the processor 81 causes a character to be caused to appear again, to appear in an appearance region (e.g., the appearance region EAa, EAb, or EAc in FIG. 14) of the group to which the character belongs, and updates the player character data Db or the character data Dc. For example, in the character reappearance process of step S127, a character to be caused to appear again is controlled such that the character is caused to approach an appearance region on the game stage from airspace in the virtual space, and thereafter, the character is placed in the appearance region. Therefore, in step S127, the processor 81 executes the character reappearance process for a predetermined period of time (e.g., a 1-frame time), and then ends the process. By repeatedly performing such a process loop, the above action by the character reappearance process proceeds.

In step S128, the processor 81 executes a display control process, and proceeds to the next step. For example, the processor 81 executes a process of generating a virtual space image of the virtual space as viewed from a virtual camera disposed at a location (e.g., behind the player character PC) based on the virtual camera data Di, and displaying the virtual space image on the display screen of a display device (e.g., the display 12).

It should be noted that in the display control process of step S128, the processor 81 may set and display, for each character, a gauge G indicating how much the special action parameter of the character is, at or near the character in the virtual space image, based on the player character data Db and the character data Dc. In addition, the processor 81 may execute a process of displaying an image indicating the area of the rendered region of each group with a graph or a numerical value on the display screen, together with the virtual space image. In addition, the processor 81 may move the virtual camera in the virtual space based on the operation data Da, and update the virtual camera data Di.

Next, the processor 81 executes a transmission and reception process (step S129), and proceeds to the next step. For example, the processor 81 executes a process of receiving data relating to a competition game from game systems 1 operated by other users participating in the competition game (e.g., other users' operation data, and data relating to the locations, actions, and the like of other users' characters), and updates the communication data Dm with the received data. In addition, the processor 81 stores, as transmission data, data relating to a competition game performed in the apparatus including the processor 81 (e.g., the operation data of the user of said apparatus, and the location, action, and the like of the player character PC of the user of said apparatus) into the communication data Dm, and transmits the transmission data to game systems 1 operated by other users at predetermined transmission intervals.

Next, the processor 81 determines whether or not to end the game process (step S130). The game process in step S130 is ended, for example, if the competition game has been completely finished, the user has performed an operation of ending the game, or the like. If the processor 81 determines not to end the game, the processor 81 returns to and repeats step S122. If the processor 81 determines to end the game, the processor 81 proceeds to step S131.

In step S131, the processor 81 executes a game result determination process, and ends the process of the flowchart. For example, the processor 81 executes a process of determining win/loss in the competition game, and displaying a scene image based on the determination result on the display screen of a display device (e.g., the display 12). In addition, the processor 81 transmits details of the competition game (win/loss in the competition game, achievements of each participating group, and achievements of each participating character) to a server.

Thus, in the present example, in a competition game in which three groups participate, a side including a group having an appearance region at or near a center of a game stage competes with a side including two groups having an appearance region at respective end portions of the game stage, and therefore, a balance in competition between the groups can be easily adjusted, so that match-up between competing groups can be easily established. For example, in the present example, three groups do not compete with each other in even situations, and a defensive side including a group having an appearance region at or near a center of a game stage competes with an offensive side including two groups having an appearance region on either side of the defensive-side appearance region (i.e., the defensive-side's appearance region is interposed between the offensive-side's appearance regions). Therefore, confrontation between three groups is clarified in a game in which the three groups participate, and the target of an action that should be performed by each group is clarified. Therefore, the tactic aspect of a competition between three groups can be improved, and a competition game between two groups can be modified into a competition game between three groups by a few changes. In addition, a first object OBJ1 that can be acquired by an offensive side is caused to appear at or near a center of a game stage, and therefore, an offensive side's role and a defensive side's role can be clearly distinguished from each other. Furthermore, it is determined whether a group is to serve as a defensive-side group or an offensive-side group, based on how much the achievements thereof are at a halfway point (the "first period") through the game flow, and therefore, difficulty in matching up groups due to a difference in popularity between defense and offense in a competition game can be minimized.

It should be noted that in the above examples, the number of characters belonging to a defensive-side group including a single group is greater than the number of characters belonging to each group in an offensive-side group including two groups. Due to the difference in the number of characters, the rendered region painted in a color corresponding to the single group included in the defensive-side group is larger than the rendered region painted in a color corresponding to each of the two groups included in the offensive-side group. Therefore, the defensive-side group has a greater advantage in terms of win/loss in a competition game. In addition, a group having a great number of characters belonging thereto, when directly competing with another group on a game stage, mostly has more characters than that of the opponent group. In this regard, the defensive-side group has a greater advantage in terms of win/loss in a competition game. As described above, for example, only the two groups of the offensive-side group are allowed to acquire the second object OBJ2, or the period of time until a character belonging to the two groups of the offensive-side group appears again in the virtual space is chosen to be shorter than that of the defensive-side group, whereby the above constraint is relaxed. The above constraint may be relaxed by other adjustment fashions.

The game system 1 may be any suitable apparatus, including devices such as personal computers, stationary game apparatuses, mobile telephones, smartphones, handheld game apparatuses, personal digital assistants (PDAs), cameras, and tablet computers.

In the foregoing, the information processes (game processes) are each performed in the game system 1 by way of example. Alternatively, at least a portion of the process steps may be performed in another apparatus. For example, when the game system 1 can also communicate with another apparatus (e.g., another server, another image display apparatus, another game apparatus, another mobile terminal, etc.), the process steps may be executed in cooperation with the second apparatus. By thus causing another apparatus to perform a portion of the process steps, a process similar to the above process can be performed. The above information processes (game processes) may be executed by a single processor or a plurality of cooperating processors included in an information processing system including at least one information processing apparatus. In the above example, the information processes can be performed by the processor 81 of the game system 1 executing predetermined programs. Alternatively, all or a portion of the above processes may be performed by a dedicated circuit included in the game system 1.

Here, according to the above variation, the present example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of step S may be performed by substantially any of the apparatuses, and the present example may be implemented by assigning the apparatuses the steps in substantially any manner.

The order of steps, setting values, conditions for determination, etc., used in the above information process are merely illustrative, and of course, other order of steps, setting values, conditions for determination, etc., may be used to implement the present example.

The above programs may be supplied to the game system 1 not only through an external storage medium, such as an external memory, but also through a wired or wireless communication line. The program may be previously stored in a non-volatile storage device in the game system 1. Examples of an information storage medium storing the program include non-volatile memories, and in addition, CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage media.

While several example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of the present example and common technical knowledge. It should be understood throughout the present specification that expression of a singular form includes the concept of its plurality unless otherwise mentioned. Specifically, articles or adjectives for a singular form (e.g., "a", "an", "the", etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which the present example pertain. If there is any inconsistency or conflict, the present specification (including the definitions) shall prevail.

Thus, the present example provides a game program, game apparatus, game system, and game processing method capable of improving the tactic aspect of a game in which three or more groups participate and compete with each other.

What is claimed is:

1. A non-transitory computer-readable storage medium having stored therein a game program that when executed by a computer of a game apparatus, causes the computer to perform operations comprising:

controlling a plurality of characters each belonging to one of a first group, a second group, and a third group, separately, in a virtual space;

setting a first appearance region in which a character belonging to the first group appears on a game stage, at or near a center of the game stage, and setting a second appearance region and a third appearance region in which characters belonging to the second group and the third group, respectively, appear on the game stage, closer to respective end portions of the game stage than the first appearance region is;

based on an action performed by each character, rendering a color relating to a group to which the character belongs on the game stage;

causing a character belonging to one of the groups to perform an action more advantageously in a game when the character is in a region rendered in the color relating to the group to which the character belongs than when the character is not in the region; and determining that the first group is a winner in the game when a first condition that is a winning condition for the first group is satisfied based on actions performed by the characters, and that the second and third groups are a winner in the game when a second condition that is a winning condition for the second and third groups is satisfied based on actions performed by the characters.

2. The non-transitory computer-readable storage medium according to claim 1, wherein it is determined whether or not the first or second condition is satisfied, and which of the groups is a winner, based on the area of the region rendered in the color relating to the first group, the area of the region rendered in the color relating to the second group, and the area of the region rendered in the color relating to the third group.

3. The non-transitory computer-readable storage medium according to claim 2, wherein it is determined that the first condition is satisfied, so that the first group is a winner, when the area of the region rendered in the color relating to the first group is greater than the area of each of the region rendered in the color relating to the second group and the region rendered in the color relating to the third group, and it is determined that the second condition is satisfied, so that the second and third groups are a winner, when the area of the region rendered in the color relating to the first group is smaller than the area of at least one of the region rendered in the color relating to the second group and the region rendered in the color relating to the third group.

4. The non-transitory computer-readable storage medium according to claim 2, wherein it is determined whether or not the first or second condition is satisfied, and which of the groups is a winner, based on the area of the region rendered in the color relating to the first group, and the sum of the area of the region rendered in the color relating to the second group and the area of the region rendered in the color relating to the third group.

5. The non-transitory computer-readable storage medium according to claim 1, wherein the game program further causes the computer to perform operations comprising:

causing one of the characters that satisfies a disappearance condition to disappear from the game stage, and causing the disappearing character to appear again in the appearance region set for the group to which the disappearing character belongs.

6. The non-transitory computer-readable storage medium according to claim 5, wherein the game program further causes the computer to perform operations comprising:

causing the disappearing character to appear again in the appearance region after a waiting period of time has passed since the disappearance from the game stage, wherein the waiting period of time for the character belonging to the first group is chosen to be shorter than the waiting period of time set for the characters belonging to the second and third groups.

7. The non-transitory computer-readable storage medium according to claim 1, wherein the controlling the characters includes choosing the number of characters belonging to the first group to be greater than each of the number of characters belonging to the second group and the number of characters belonging to the third group.

8. The non-transitory computer-readable storage medium according to claim 7, wherein the controlling the characters includes choosing the number of characters belonging to the first group to be equal to the sum of the number of characters belonging to the second group and the number of characters belonging to the third group.

9. The non-transitory computer-readable storage medium according to claim 1, wherein the game program further causes the computer to perform operations comprising:

disposing a first object at or near a center of the game stage; and when one of the characters performs a first action on the first object, then if the first action satisfies an acquisition condition, disposing a second object relating to the first object at a location on the game stage in association with the group to which the character performing the first action satisfying the acquisition condition belongs, wherein the color relating to the group associated with the second object is rendered on the game stage around the second object.

10. The non-transitory computer-readable storage medium according to claim 9, wherein the character belonging to the second or third group is allowed to perform the first action on the first object.

11. The non-transitory computer-readable storage medium according to claim 9, wherein the first object is caused to appear and is disposed after a first period of time has passed since the start of the game and after a second period of time has passed since the performance of the first action.

12. The non-transitory computer-readable storage medium according to claim 9, wherein when as the first action, an action of causing a character to remain in a range with reference to the first object disposed on the game stage is performed, it is determined that the acquisition condition is satisfied, and the second object is disposed.

13. The non-transitory computer-readable storage medium according to claim 12, wherein when a time count for which the character has remained in the range reaches a threshold time, it is determined that the acquisition condition is satisfied, and the second object is disposed, and when the character ends remaining in the range before the time count reaches the threshold time, the time count is reset, and the threshold time is reduced and set for the next time count.

14. The non-transitory computer-readable storage medium according to claim 9, wherein the relating color continues to be rendered around the second object until the end of the game.

15. The non-transitory computer-readable storage medium according to claim 9, wherein the game program further causes the computer to perform operations comprising:

when a special action parameter relating to the character reaches a value, allowing the character to perform a special action according to a user's operation input; and increasing the special action parameters of all characters belonging to the group relating to the second object, in response to rendering in the relating color by the second object.

16. The non-transitory computer-readable storage medium according to claim 1, wherein the game program further causes the computer to perform operations comprising:

when a special action parameter relating to the character reaches a value, allowing the character to perform a special action according to a user's operation input, and the allowing the character to perform a special action includes increasing the special action parameter of the character, in response to rendering in the relating color based on an action performed by the character, when in the region in which the relating color has already been rendered, the same relating color is further rendered, avoiding increasing the special action parameter in response to the rendering, when the color relating to the third group is rendered in a region in which the color relating to the second group has already been rendered, increasing the special action parameters of all characters belonging to the third group or the character for which the rendering has been performed, and when the color relating to the second group is rendered in a region in which the color relating to the third group has already been rendered, increasing the special action parameters of all characters belonging to the second group or the character for which the rendering has been performed.

17. The non-transitory computer-readable storage medium according to claim 1, wherein the game program further causes the computer to perform operations comprising:

setting a plurality of group candidates by assigning a character operated by a user performing an operation input, to one of three group candidates, according to vote based on the user's operation input, and the setting the group candidates includes setting each of the three group candidates to a first group candidate from which a character belonging to the first group is to be chosen, a second group candidate from which a character belonging to the second group is to be chosen, or a third group candidate from which a character belonging to the third group is to be chosen, based on a result of a game in which characters which are assigned to two of the three group candidates compete with each other.

18. A game apparatus comprising a processor, the processor being configured to at least:

control a plurality of characters each belonging to one of a first group, a second group, and a third group, separately, in a virtual space;

set a first appearance region in which a character belonging to the first group appears on a game stage, at or near a center of the game stage, and set a second appearance region and a third appearance region in which characters belonging to the second group and the third group, respectively, appear on the game stage, closer to respective end portions of the game stage than the first appearance region is;

based on an action performed by each character, render a color relating to a group to which the character belongs on the game stage;

cause a character belonging to one of the groups to perform an action more advantageously in a game when the character is in a region rendered in the color relating to the group to which the character belongs than when the character is not in the region; and determine that the first group is a winner in the game when a first condition that is a winning condition for the first group is satisfied based on actions performed by the characters, and that the second and third groups are a winner in the game when a second condition that is a winning condition for the second and third groups is satisfied based on actions performed by the characters.

19. A game system comprising a processor, the processor being configured to at least:

control a plurality of characters each belonging to one of a first group, a second group, and a third group, separately, in a virtual space;

set a first appearance region in which a character belonging to the first group appears on a game stage, at or near a center of the game stage, and set a second appearance region and a third appearance region in which characters belonging to the second group and the third group, respectively, appear on the game stage, closer to respective end portions of the game stage than the first appearance region is;

based on an action performed by each character, render a color relating to a group to which the character belongs on the game stage;

cause a character belonging to one of the groups to perform an action more advantageously in a game when the character is in a region rendered in the color relating to the group to which the character belongs than when the character is not in the region; and determine that the first group is a winner in the game when a first condition that is a winning condition for the first group is satisfied based on actions performed by the characters, and that the second and third groups are a winner in the game when a second condition that is a winning condition for the second and third groups is satisfied based on actions performed by the characters.

20. A game processing method comprising:

controlling a plurality of characters each belonging to one of a first group, a second group, and a third group, separately, in a virtual space;

setting a first appearance region in which a character belonging to the first group appears on a game stage, at or near a center of the game stage, and setting a second appearance region and a third appearance region in which characters belonging to the second group and the third group, respectively, appear on the game stage, closer to respective end portions of the game stage than the first appearance region is;

based on an action performed by each character, rendering a color relating to a group to which the character belongs on the game stage;

causing a character belonging to one of the groups to perform an action more advantageously in a game when the character is in a region rendered in the color relating to the group to which the character belongs than when the character is not in the region; and determining that the first group is a winner in the game when a first condition that is a winning condition for the first group is satisfied based on actions performed by the characters, and that the second and third groups are a winner in the game when a second condition that is a winning condition for the second and third groups is satisfied based on actions performed by the characters.

* * * * *